United States Patent
Chao et al.

(10) Patent No.: US 10,790,538 B2
(45) Date of Patent: Sep. 29, 2020

(54) NEGATIVE ELECTRODE AND LITHIUM ION BATTERY

(71) Applicant: INDUSTRIAL TECHNOLOGY RESEARCH INSTITUTE, Hsinchu (TW)

(72) Inventors: Chung-Hsiang Chao, Hsinchu (TW); Chia-Chen Fang, Taipei (TW); Chih-Ching Chang, Hsinchu (TW); Wei-Hsin Wu, Hsinchu (TW); Nae-Lih Wu, Taipei (TW); Sheng-Hui Wu, Hsinchu (TW); Jing Luo, Taipei (TW)

(73) Assignee: INDUSTRIAL TECHNOLOGY RESEARCH INSTITUTE, Hsinchu (TW)

(*) Notice: Subject to any disclaimer, the term of this patent is extended or adjusted under 35 U.S.C. 154(b) by 44 days.

(21) Appl. No.: 16/059,300

(22) Filed: Aug. 9, 2018

(65) Prior Publication Data

US 2019/0051926 A1 Feb. 14, 2019

Related U.S. Application Data

(60) Provisional application No. 62/544,470, filed on Aug. 11, 2017.

(30) Foreign Application Priority Data

Dec. 14, 2017 (TW) .............................. 106143936 A

(51) Int. Cl.
| | |
|---|---|
| *H01M 10/0525* | (2010.01) |
| *H01M 4/66* | (2006.01) |
| *H01M 4/04* | (2006.01) |
| *H01M 4/36* | (2006.01) |
| *H01M 4/38* | (2006.01) |
| *H01M 4/62* | (2006.01) |
| *H01M 4/587* | (2010.01) |
| *H01M 4/133* | (2010.01) |
| *H01M 4/134* | (2010.01) |
| *H01M 10/42* | (2006.01) |
| *H01M 4/1395* | (2010.01) |
| *H01M 4/485* | (2010.01) |
| *H01M 4/583* | (2010.01) |
| *H01M 4/02* | (2006.01) |

(52) U.S. Cl.
CPC ..... *H01M 10/0525* (2013.01); *H01M 4/0404* (2013.01); *H01M 4/0452* (2013.01); *H01M 4/133* (2013.01); *H01M 4/134* (2013.01); *H01M 4/1395* (2013.01); *H01M 4/366* (2013.01); *H01M 4/382* (2013.01); *H01M 4/485* (2013.01); *H01M 4/587* (2013.01); *H01M 4/62* (2013.01); *H01M 4/622* (2013.01); *H01M 4/661* (2013.01); *H01M 4/663* (2013.01); *H01M 4/667* (2013.01); *H01M 4/668* (2013.01); *H01M 4/669* (2013.01); *H01M 10/4235* (2013.01); *H01M 4/583* (2013.01); *H01M 2004/027* (2013.01); *H01M 2004/028* (2013.01)

(58) Field of Classification Search
CPC combination set(s) only.
See application file for complete search history.

(56) References Cited

U.S. PATENT DOCUMENTS

| | | | |
|---|---|---|---|
| 9,136,516 | B2 | 9/2015 | Fang et al. |
| 9,376,412 | B2 | 6/2016 | Tsai et al. |
| 9,590,269 | B2 | 3/2017 | Chao et al. |
| 2014/0178770 | A1 | 6/2014 | Xu et al. |
| 2014/0295290 | A1 | 10/2014 | Park et al. |
| 2015/0056488 | A1 | 2/2015 | Zhang et al. |
| 2016/0099483 | A1* | 4/2016 | Lee ................. H01M 4/623 429/217 |
| 2017/0162861 | A1 | 6/2017 | Lin et al. |
| 2017/0179532 | A1 | 6/2017 | Archer et al. |
| 2018/0019497 | A1 | 1/2018 | Lin et al. |
| 2018/0062154 | A1* | 3/2018 | Park ................. H01M 4/1395 |

FOREIGN PATENT DOCUMENTS

| | | |
|---|---|---|
| CN | 1137178 A | 12/1996 |
| CN | 1591939 A | 3/2005 |
| CN | 103972470 A | 8/2014 |
| CN | 104051776 A | 9/2014 |
| CN | 105140449 A | 12/2015 |
| CN | 104254940 B | 3/2017 |
| CN | 104025345 B | 5/2017 |
| CN | 106684433 A | 5/2017 |
| TW | 393797 B | 6/2000 |
| TW | 201824618 A | 7/2018 |

(Continued)

OTHER PUBLICATIONS

T Kaura et al., "Simultaneous stretching and corona poling of PVDF films", J. Phys. D: Appl. Phys. 24 1848, 1991.*
Abdelghany et al., "Structural and Physical Studies of PVC/PVDF Doped Nano Lithium Salt for Electrochemical Applications," Journal of Advances in Physics, vol. 13, No. 3, Mar. 2017, pp. 4718-4725.
Costa et al., "Battery Separators Based on Vinylidene Fluoride (VDF) Polymers and Copolymers for Lithium Ion Battery Applications," RSC Advances, May 2013 (Published Apr. 3, 2013), 15 pages.

(Continued)

*Primary Examiner* — Ladan Mohaddes
(74) *Attorney, Agent, or Firm* — Birch, Stewart, Kolasch & Birch, LLP

(57) ABSTRACT

A lithium ion battery is provided, which includes a positive electrode, a negative electrode, and an electrolyte disposed between the positive electrode and the negative electrode. The negative electrode includes a current collector and a β-phase-based polyvinylidene fluoride (β-PVDF) layer coating on the current collector. The β-PVDF layer may have a thickness of 1 μm to 10 μm.

8 Claims, 33 Drawing Sheets

(56) References Cited

FOREIGN PATENT DOCUMENTS

| TW | 201824628 A | 7/2018 |
|---|---|---|
| WO | WO 2015/045707 A1 | 4/2015 |

OTHER PUBLICATIONS

Lee et al., "Composite Protective Layer for Li Metal Anode in High-performance Lithium-oxygen Batteries," Electrochemistry Communications, vol. 40, 2014 (Available online Dec. 27, 2013), pp. 45-48.

Taiwanese Office Action and Search Report, dated Apr. 3, 2019, for Taiwanese Application No. 107127997.

Liu et al., "A Soft Non-porous Separator and its Effectiveness in Stabilizing Li Metal Anodes Cycling at 10 mA cm$^{-2}$ Observed in situ in a Capillary Cell," Journal of Materials Chemistry A, vol. 5, 2017 (Jan. 24, 2017), pp. 4300-4307.

Liu et al., "An Artificial Solid Electrolyte Interphase with High Li-Ion Conductivity, Mechanical Strength, and Flexibility for Stable Lithium Metal Anodes," Advanced Materials, vol. 29, 2017, pp. 1-8.

Liu et al., "Lithium Metal Anodes with an Adaptive "Solid-Liquid" Interfacial Protective Layer," Journal of the American Chemical Society, vol. 139, 2017 (Published Mar. 17, 2017), pp. 4815-4820.

Taiwanese Office Action, dated Jun. 28, 2018, for Taiwanese Application No. 106143936.

Wang et al., "SBR—PVDF Based Binder for the Application of SLMP in Graphite Anodes," RSC Advances, vol. 3, 2013 (Published Jun. 27, 2013), pp. 15022-15027.

Zeng et al., "Reshaping Lithium Plating/Stripping Behavior via Bifunctional Polymer Electrolyte for Room-Temperature Solid Li Metal Batteries," Journal of the American Chemical Society, vol. 138, 2016 (Published Nov. 30, 2016), pp. 15825-15828.

Zhu et al., "Poly(dimethylsiloxane) Thin Film as a Stable Interfacial Layer for High-Performance Lithium-Metal Battery Anodes," Advanced Materials, vol. 29, 2017, pp. 1-6.

Taiwanese Office Action issued in Application No. 107127997, dated Mar. 3, 2020.

\* cited by examiner

NEGATIVE ELECTRODE AND LITHIUM ION BATTERY

CROSS REFERENCE TO RELATED APPLICATIONS

This application claims the benefit of U.S. Provisional Application No. 62/544,470, filed on Aug. 11, 2017, and Taiwan Application Serial Number 106143936, filed on Dec. 14, 2017, the disclosure of which is hereby incorporated by reference herein in its entirety.

TECHNICAL FIELD

The technical field relates to a lithium ion battery, and it relates to a layered structure and composition of a negative electrode in the lithium ion battery.

BACKGROUND

High energy density, long service life, high safety, and low cost are the qualities being pursued by the designers of rechargeable batteries. Li metal negative electrode is seen as a promising candidate for Li-ion battery (LIB) negative electrodes due to its low electrochemical potential (−3.04V vs. standard hydrogen electrode) and ultrahigh theoretical capacity (3860 mAh/g). However, in the late 1980s, safety concerns led to Li metal cells being replaced by LIBs with graphite negative electrodes. Major challenges for Li metal negative electrodes are rooted in the dendritic Li depositing on metal substrate. The Li dendrite growth may cause low columbic efficiency, infinite volume expansion, accelerated electrolyte decomposition, and even penetration of the separator to trigger short circuit and thermal runaway. Like the lithium metal negative electrodes, the graphite negative electrodes may also have the problem of Li dendrite depositing thereon after overcharge or fast charge (e.g. by a large current).

Accordingly, a novel negative electrode structure is needed to avoid the Li dendrite growth.

SUMMARY

One embodiment of the disclosure provides a negative electrode, including a current collector; and a β-phase-based polyvinylidene fluoride layer coating on the current collector.

One embodiment of the disclosure provides a lithium ion battery, including a positive electrode; a negative electrode; and an electrolyte disposed between the positive electrode and the negative electrode, wherein the negative electrode includes a current collector; and a β-phase-based polyvinylidene fluoride layer coating on the current collector.

A detailed description is given in the following embodiments with reference to the accompanying drawings.

BRIEF DESCRIPTION OF THE DRAWINGS

The disclosure can be more fully understood by reading the subsequent detailed description and examples with references made to the accompanying drawings, wherein.

DETAILED DESCRIPTION

Figure 1:
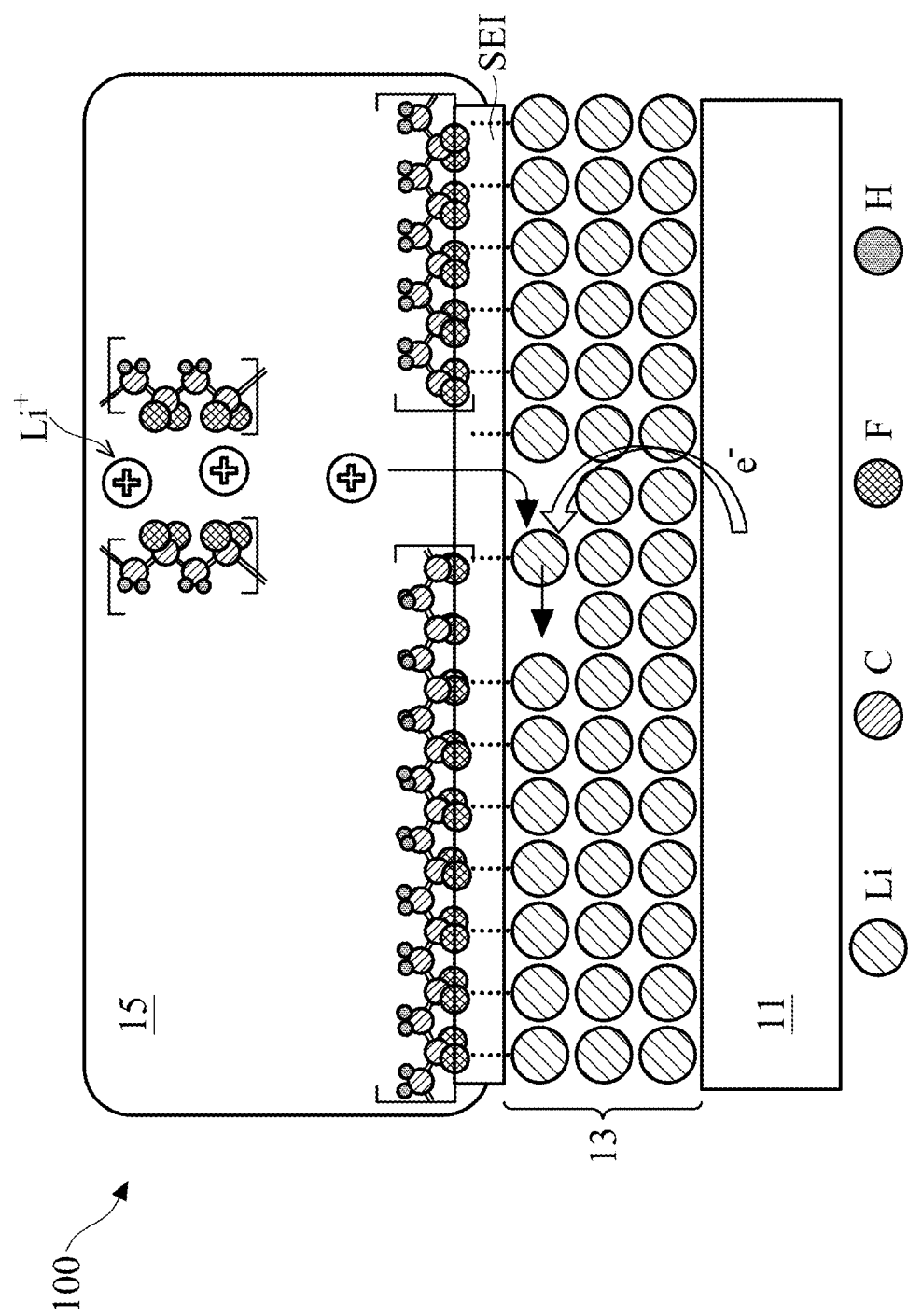
FIG. 1 shows a negative electrode in some embodiments of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

One embodiment of the disclosure provides a negative electrode 100 as shown in FIG. 1, which includes a current collector 11 and a β-phase-based polyvinylidene fluoride layer 15 (β-PVDF layer 15) coating on the current collector 11. In an FTIR spectrum of the β-PVDF layer 15, signal intensity at 840 $cm^{-1}$ serves as signal intensity of β-phase polyvinylidene fluoride, signal intensity at 764 $cm^{-1}$ serves as signal intensity of α-phase polyvinylidene fluoride, and the signal intensity of β-phase polyvinylidene fluoride and the signal intensity of α-phase polyvinylidene fluoride have a ratio of 70:30 to 95:5. The β-PVDF layer 15 may provide channel to deposit lithium ions (from the electrolyte) between the current collector 11 and the β-PVDF layer 15 when charging cells, thereby forming a solid-state electrolyte interface (SEI). The SEI is beneficial to keep the columbic efficiency of the cell after several charge/discharge cycles. In addition, the β-PVDF layer 15 may prevent the formation of lithium dendrite.

In one embodiment, the β-PVDF layer 15 has a thickness of 1 μm to 10 μm. A β-PVDF layer 15 that is too thin cannot inhibit the formation of the lithium dendrite. A β-PVDF layer 15 that is too thick will increase the resistance of the lithium ions travelling through the β-PVDF layer 15, thereby increasing the charge/discharge polarization. In some embodiments, the current collector 11 includes lithium, copper, aluminum, nickel, stainless steel, or graphite.

In some embodiments, the negative electrode 100 further includes an active material disposed between the current collector 11 and the β-PVDF layer 15, and the composition of the active material 13 is different from the composition of the current collector 11. For example, the active material 13 includes graphite, silicon, $Li_4Ti_5O_{12}$, or lithium metal. In some embodiments, the current collector 11 is a copper foil, and the active material 13 can be a lithium layer. In some embodiments, the current collector 11 is a copper foil, and the active material 13 can be graphite particles.

In some embodiments, the negative electrode 100 may collocate with a positive electrode, and an electrolyte can be disposed between the negative electrode 100 and the positive electrode to complete a lithium ion battery. In some embodiments, a separator film (e.g. polyolefin) can be disposed between the positive electrode and the negative electrode 100. As proven by experiments, the lithium ion battery utilizing the negative electrode 100 has a better columbic efficiency and stability than a lithium ion battery utilizing a general negative electrode (without the β-PVDF layer coating on the current collector) after several charge/discharge cycles. In some embodiments, the electrolytes can be classified to liquid-state, gel-state, and solid-state. The liquid-state electrolyte is composed of lithium salt and solvent (or ionic liquid). The common lithium salt includes $LiPF_6$, $LiAsF_6$, $LiClO_4$, $LiBF_4$, LiTFSI, $LiCF_3SO_3$, or the like. The common solvent includes cyclic carbonate (such as ethylene carbonate or propylene carbonate), linear carbonate (such as dimethyl carbonate, diethyl carbonate, or ethylmethyl carbonate), ether compound (such as dimethyl ether or 1,3-dioxolane), or the like. The solid-state electrolyte can be classified to polymer and glass ceramic. In some embodiments, the material of the positive electrode includes lithium iron phosphate, lithium cobalt oxide, lithium manganese oxide, lithium nickel cobalt aluminum oxide, lithium nickel cobalt manganese oxide (ternary), lithium-rich manganese oxide, or the like.

The capacities of both the positive electrode and the negative electrode should be enhanced to increase the total capacity of the lithium ion battery. The capacity of the conventional positive electrode is increased from 170 mAh/g to 190~200 mAh/g. Enhancing the capacity of the positive electrode may efficiently increase the energy density of the battery, which is ensured by the high columbic efficiency and reversibility of the positive electrode. The conventional graphite negative electrode has a capacity of 360 mAh/g. If the lithium metal is selected as a negative electrode, which has a capacity of 3000 mAh/g that is greatly larger than the capacity of the graphite negative electrode. However, the lithium dendrite and the columbic efficiency of the lithium metal seriously limit its application. When the current collector 11 or the active material 13 is carbon material such as graphite, its surface can be coated by a polymer film to inhibit the lithium dendrite. As such, the capacity of the graphite electrode can be enhanced to 432 mAh/g by 20% over-lithiation, which may efficiently increase the capacity of the battery and ensure the reversibility of the battery.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

EXAMPLES

Preparation Example 1 (β-PVDF@Cu)

Figure 2A:
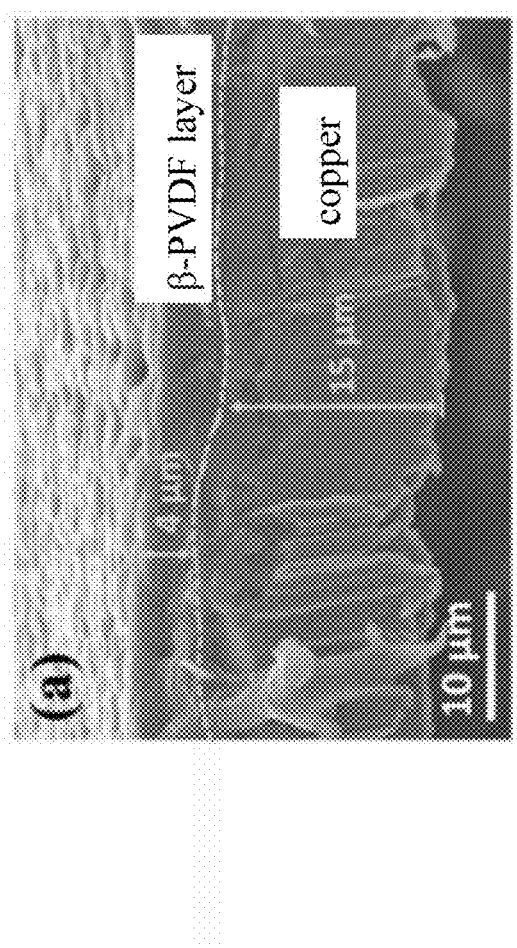
FIG. 2A shows a surface morphology of a β-PVDF layer in some embodiments of the disclosure.
Figure 2B:
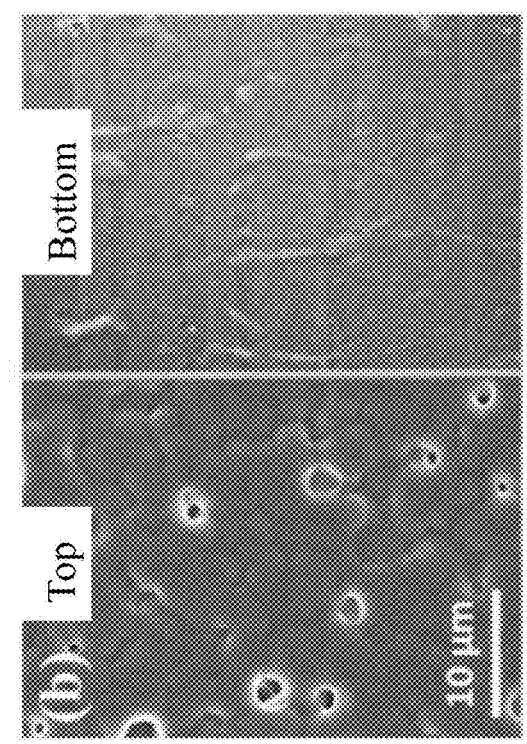
FIG. 2B shows a top morphology and a bottom morphology of the β-PVDF layer in some embodiments of the disclosure.

Polyvinylidene difluoride (PVDF, Kynar® HSV900 commercially available from Arkema Inc.) was dissolved in dimethylacetamide (DMAc) at room temperature to form a 10 wt % PVDF solution. The PVDF solution was coated onto a copper foil having a thickness of 15 micrometers by an automatic blade coater (B0100 commercially available from Allreal), and then put onto a hot plate to be heated to 65° C. and kept at 65° C. for 90 minutes to remove the DMAc. In addition, this step may ensure the PVDF layer be β-phase. The β-phase PVDF layer (β-PVDF layer) had a thickness of about 4 micrometers. The copper foil with the β-PVDF layer thereon (β-PVDF@Cu) was punched to discs with a diameter of 13 mm. According to the SEM analysis, the β-PVDF layer had a surface morphology of interconnected micronsized hemispheres, as shown in FIG. 2A. The β-PVDF layer was stripped from the copper foil to observe its top and bottom. As shown in FIG. 2B, the top surface of the β-PVDF layer was porous, but the bottom of the β-PVDF layer was free of any pore. The morphology of the bottom surface of the β-PVDF layer exactly replicated a texture of the surface of the copper foil, which means the seamless attachment between the β-PVDF layer and the copper foil. The FTIR spectrum of the β-PVDF layer is shown in FIG. 2C, and the XRD spectrum of the β-PVDF layer is shown in FIG. 2D.

Preparation Example 2 (α-PVDF@Cu)

PVDF (Kynar® HSV900 commercially available from Arkema Inc.) was dissolved in DMAc at room temperature to form a 10 wt % PVDF solution. The PVDF solution was coated onto a copper foil having a thickness of 15 micrometers by an automatic blade coater (B0100 commercially available from Allreal), and then quickly dried by fast air convection at 70° C. to remove the DMAc. In addition, this step may ensure the PVDF layer be α-phase. The α-phase PVDF layer (α-PVDF layer) had a thickness of about 4 micrometers. The copper foil with the α-phase PVDF layer thereon (α-PVDF@Cu) was punched to discs with a diameter of 13 mm. The FTIR spectrum of the α-PVDF layer is shown in FIG. 2C, and the XRD spectrum of the α-PVDF layer is shown in FIG. 2D.

Figure 2C:
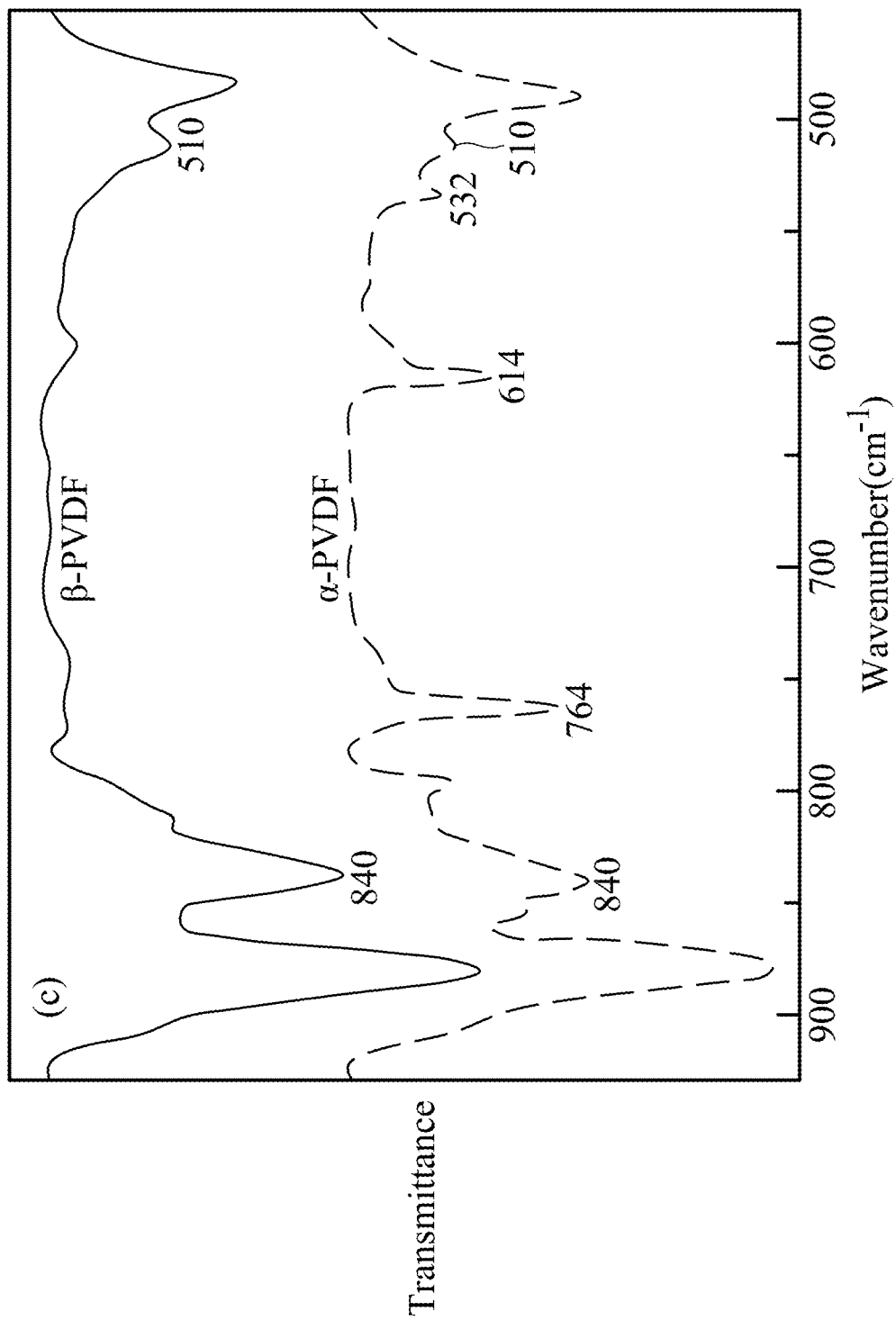
FIG. 2C show FTIR spectra of an α-PVDF layer and the β-PVDF layer in some embodiments of the disclosure.
Figure 2D:
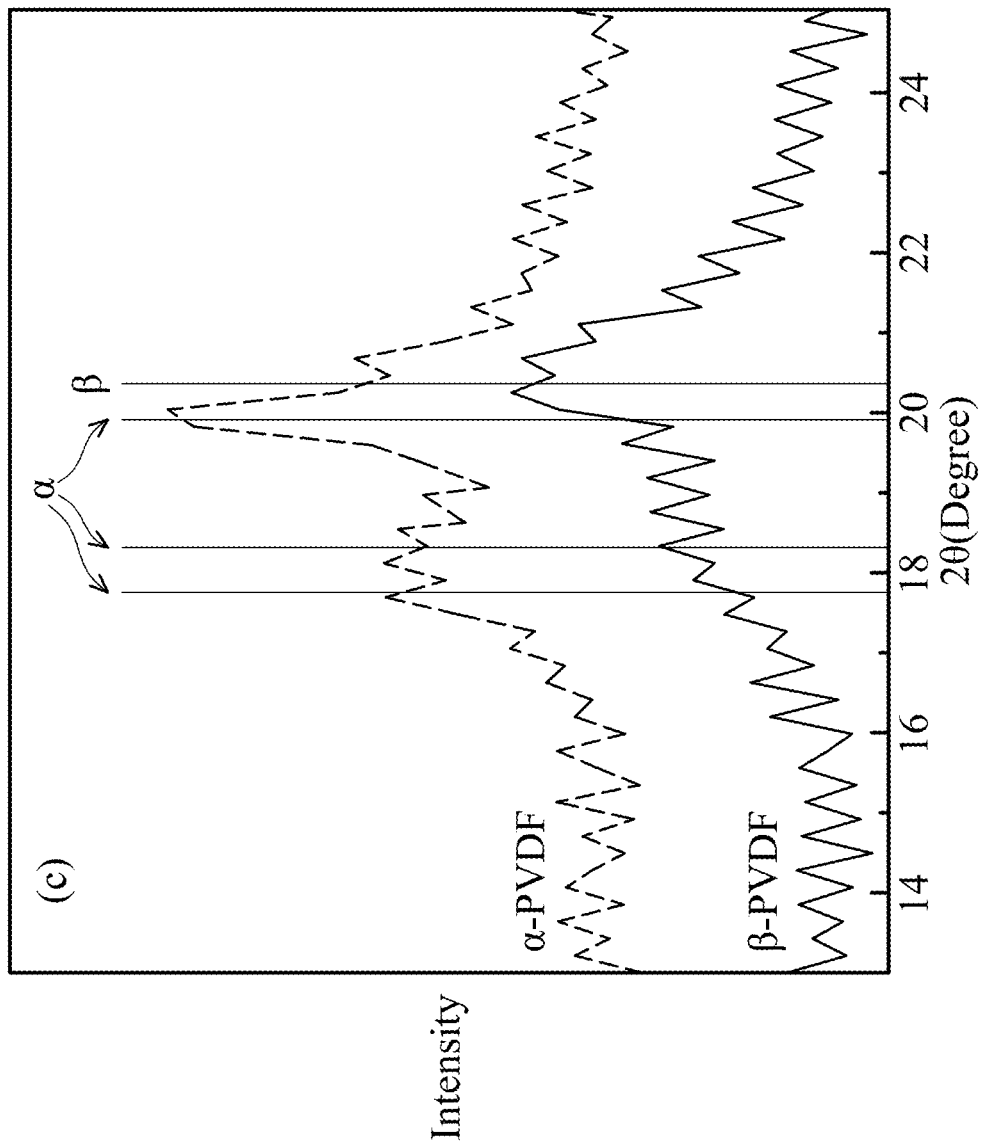
FIG. 2D shows XRD spectra of the α-PVDF layer and the β-PVDF layer in some embodiments of the disclosure.

As shown in the FTIR spectra of FIG. 2C, the β-PVDF layer had strong absorption peaks at 840 cm$^{-1}$ and 510 cm$^{-1}$, and the α-PVDF layer had strong absorption peaks at 764 cm$^{-1}$, 614 cm$^{-1}$, and 532 cm$^{-1}$. In the FTIR spectrum of the α-PVDF layer, signal intensity at 840 cm$^{-1}$ served as signal intensity of β-PVDF, signal intensity at 764 cm$^{-1}$ served as signal intensity of α-PVDF, and the signal intensity ratios of β-PVDF to α-PVDF ($I_{840}/I_{764}$) was calculated. In the α-PVDF layer, the α-phase signal (764 cm$^{-1}$) was 48.7%, and the β-phase signal (840 cm$^{-1}$) was 51.3%. As shown in the XRD spectra of FIG. 2D, the β-PVDF layer had a peak at 2θ=20.26°, and the α-PVDF layer had peaks at 2θ=17.66°, 18.30°, and 19.90°.

Example 1

Figure 3A:
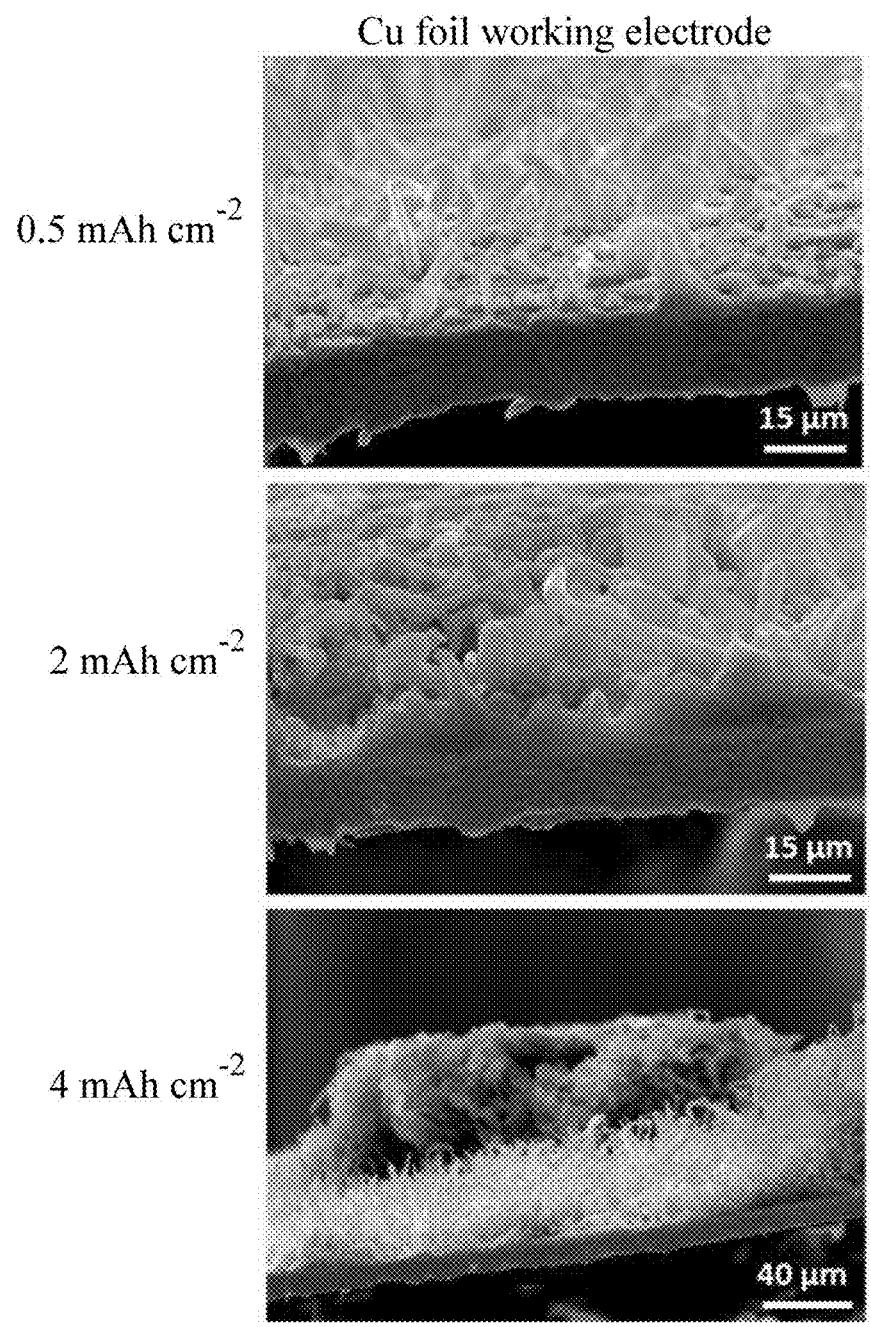
FIG. 3A show SEM photographs of a copper foil working electrode with a lithium layer deposited thereon with different capacity.

A copper foil with a thickness of 15 micrometers was selected as a working electrode, and lithium foil was selected as a counter electrode. A commercially available polypropylene (Celgard 2400) film was interposed between the working electrode and the counter electrode to serve as a separator film. The above structure was sealed by a polypropylene and then put into a cell shell. An electrolyte was 1 M lithium bis(trifluoromethanesulfonyl)imide (LiTFSI) in a 1:1 (v/v) mixture of 1,3-dioxolane (DOL) and 1,2-dimethoxyethane (DME) with 3 wt % lithium nitrate (LiNO$_3$). The electrolyte was filled into the space between the working electrode and the counter electrode to form CR2032-type coin cells. A current density of 1 mAcm$^{-2}$ with capacity loadings of 0.5, 2, and 4 mAhcm$^{-2}$ was respectively applied to deposit lithium onto the Cu negative electrodes of the cells. When the capacity loading was low (e.g. 0.5 mAhcm$^{-2}$ and 2 mAhcm$^{-2}$), the lithium deposited on the working electrodes had a rough surface with needle-like protrusions. When the capacity loading was high (e.g. 4 mAhcm$^{-2}$), the lithium deposited on the working electrode had a mixture of large dendrite aggregates (measuring hundreds of microns) on the top of a blanket of dendritic "grass". The above structures are shown in FIG. 3A.

Figure 4A:
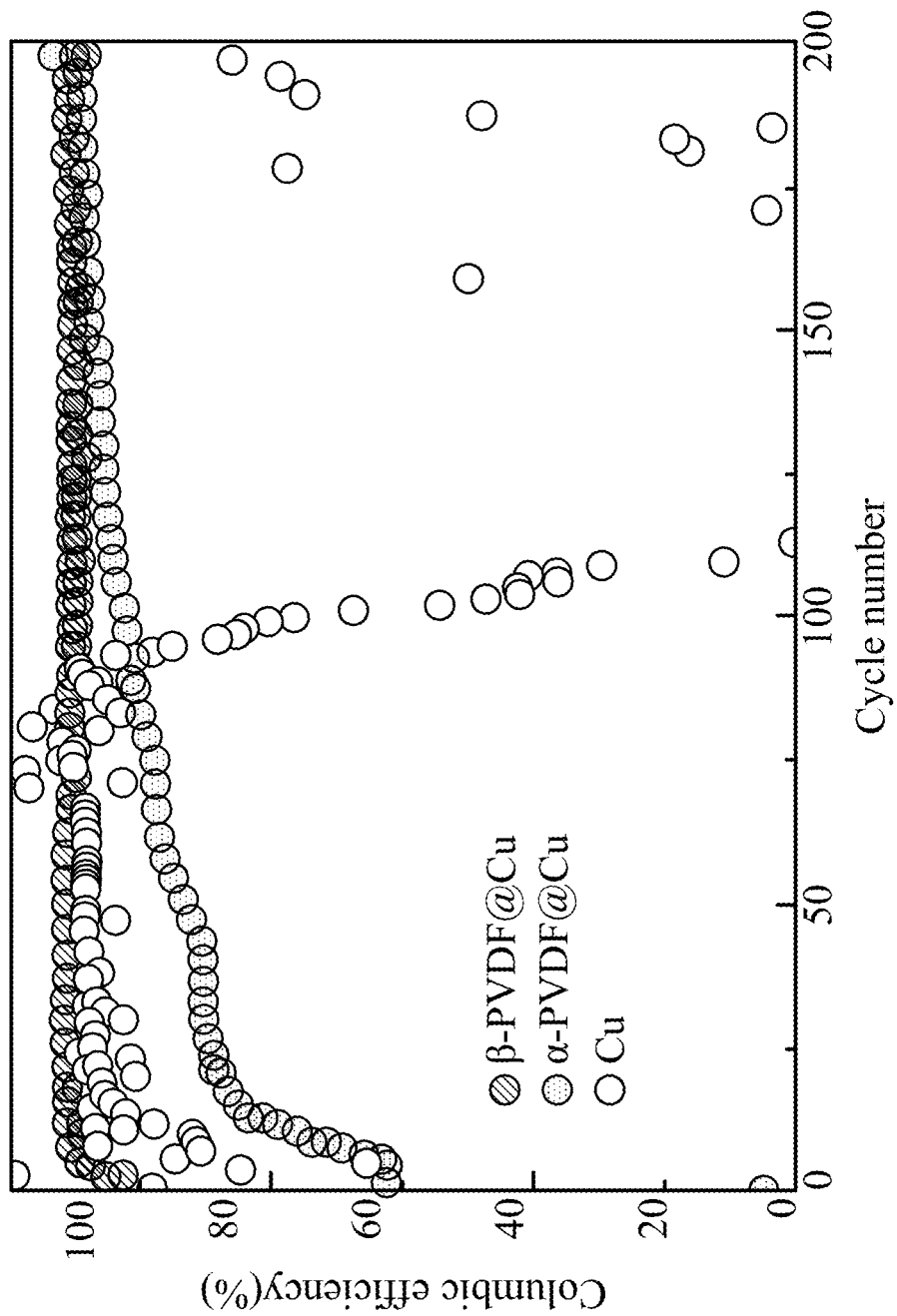
FIG. 4A shows columbic efficiencies of different cells after a test of several cycles in some embodiments of the disclosure.

After applying the current density of 1 mAcm$^{-2}$ with capacity loadings of 0.5, 2, and 4 mAhcm$^{-2}$ to deposit the lithium onto the working electrodes, and a counter voltage of 1 V was applied to strip the lithium on the working electrodes to complete a cycle. The cycling stability can be represented by columbic efficiency, which is defined by ratios of the stripped lithium amount and the deposited lithium amount in every cycle. As shown in FIG. 4A, the lithium deposition of each cycle was performed by a capacity loading of 0.5 mAhcm$^{-2}$ and a current density of 1 mAcm$^{-2}$. The columbic efficiency of the cell utilizing the copper foil working electrode was irregular and dramatically lowered after 90 cycles. The voltage hysteresis (voltage difference between the lithium deposition and lithium stripping) of the cell utilizing the copper foil working electrode suddenly increased from 30 mV to over 80 mV (see FIG. 4B), being coincident with the rapid reduction of its columbic efficiency.

Figure 4B:
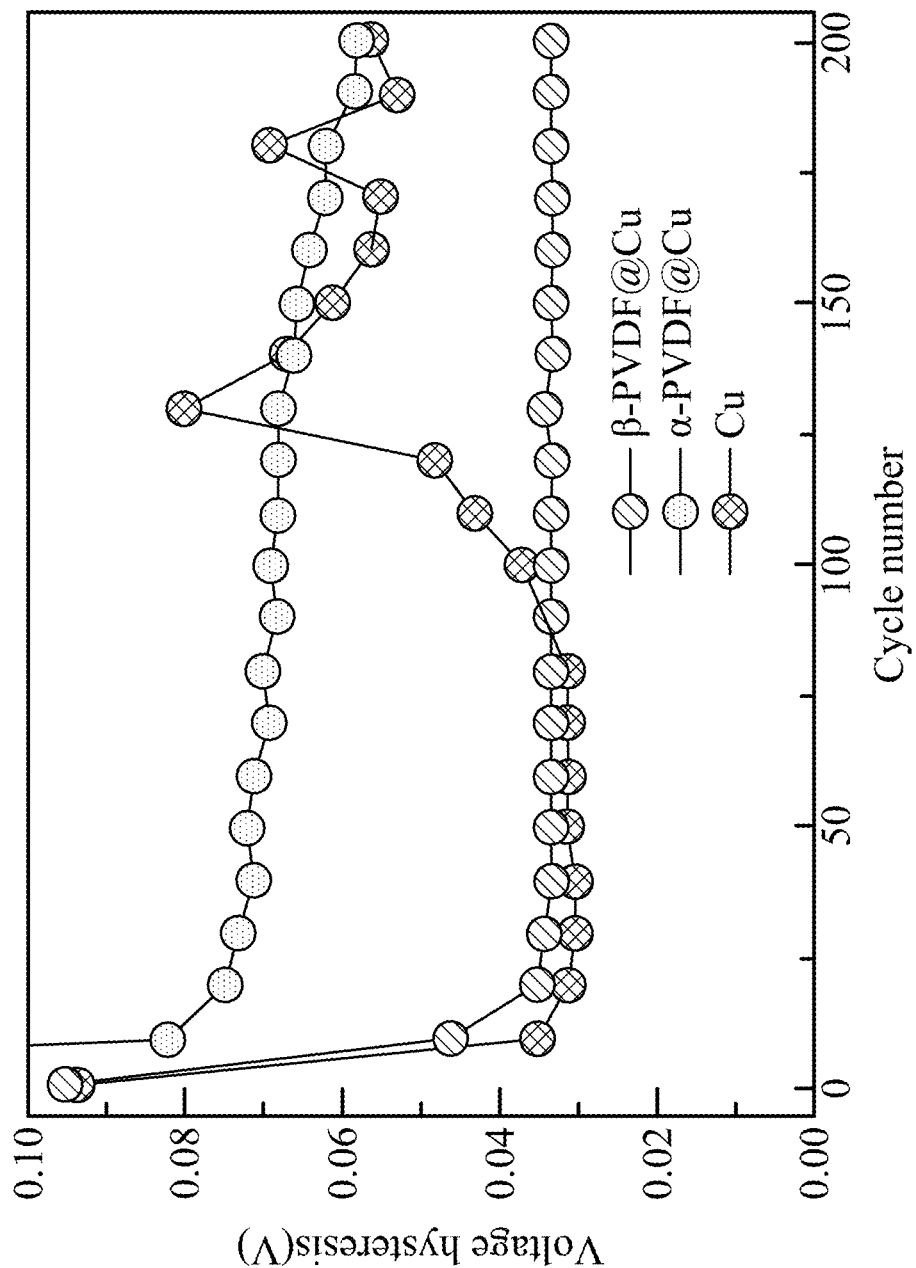
FIG. 4B shows voltage hysteresis of different cells after a test of several cycles in some embodiments of the disclosure.
Figure 4C:
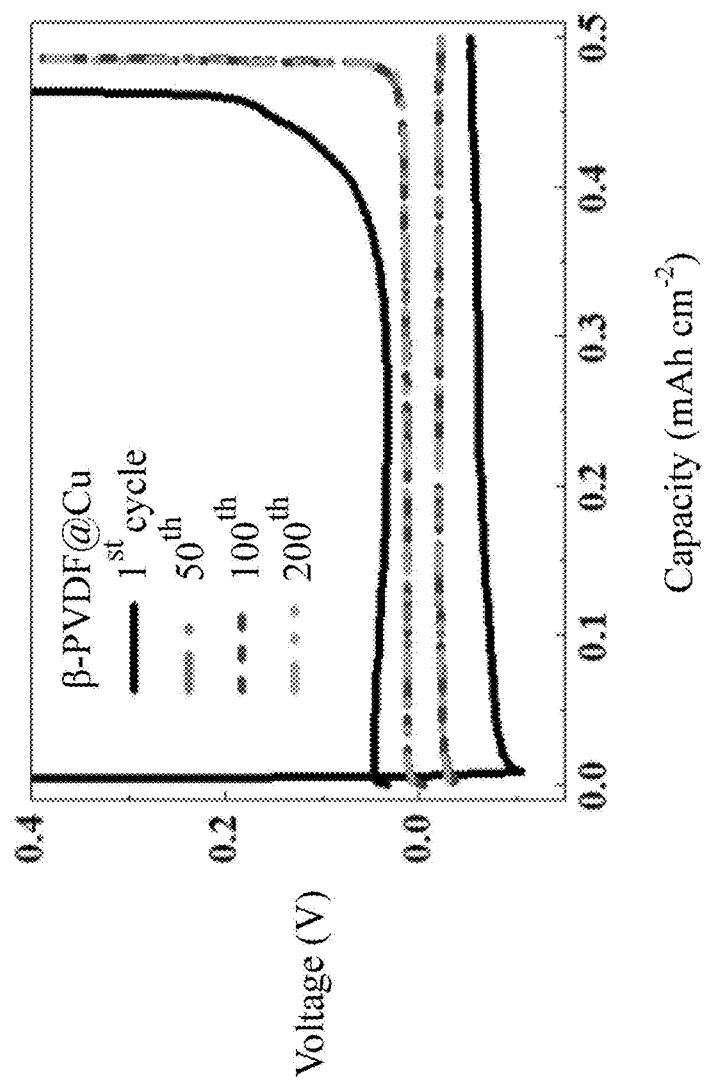
FIG. 4C shows curves of voltage versus capacity of a cell utilizing the β-PVDF@Cu working electrode after a test of several cycles in some embodiments of the disclosure.
Figure 4D:
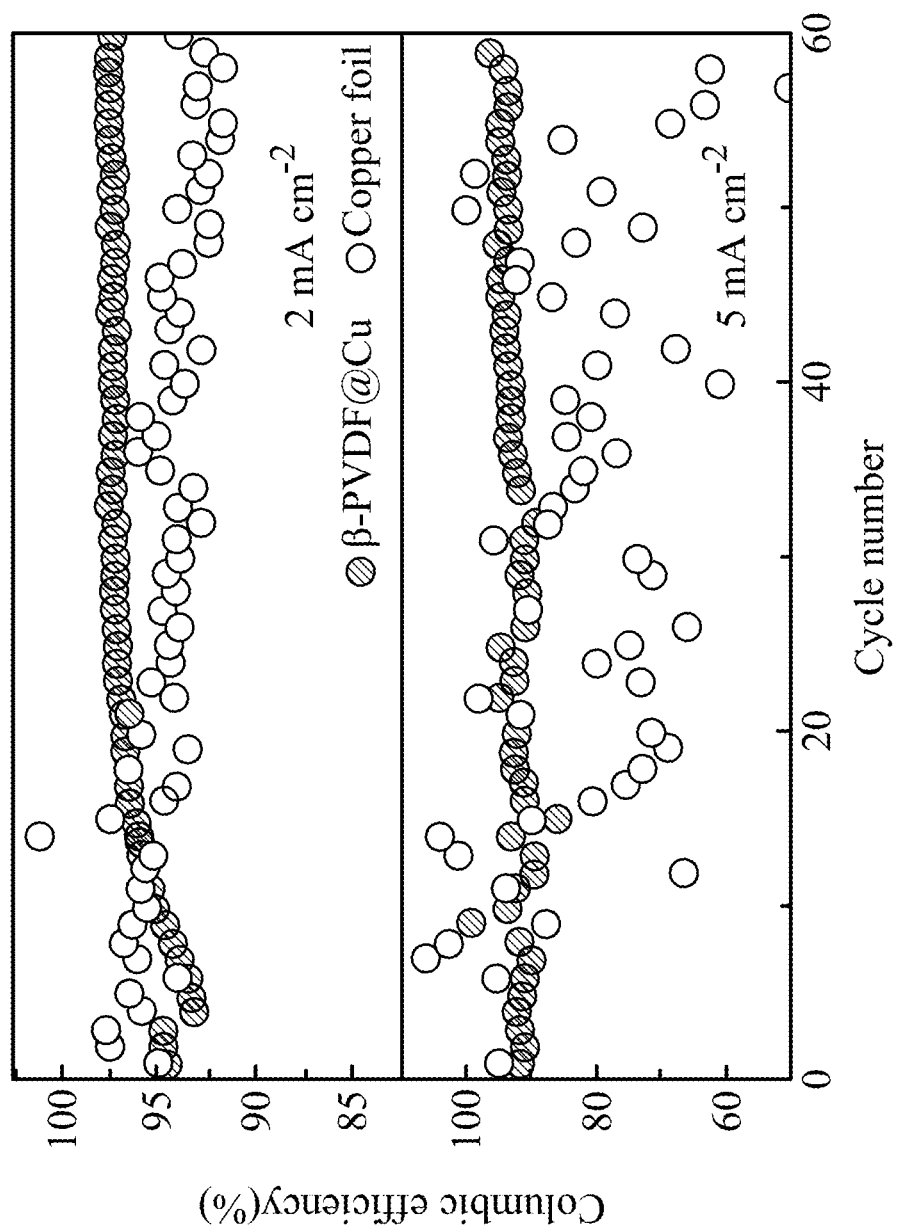
FIG. 4D shows columbic efficiencies of different cells after a test of several cycles of different current densities in some embodiments of the disclosure.

As shown in FIG. 4D, the lithium deposition of each cycle was performed by a capacity loading of 0.5 mAhcm$^{-2}$ and current densities of 2 mAcm$^{-2}$ and 5 mAcm$^{-2}$, respectively. The high current density could results in an undesired lithium dendrite, and columbic efficiencies of the cells utilizing the copper foil working electrode were more irregular when the current density was higher since the interface between the electrode and the electrolyte was unstable.

Example 2

Figure 3B:
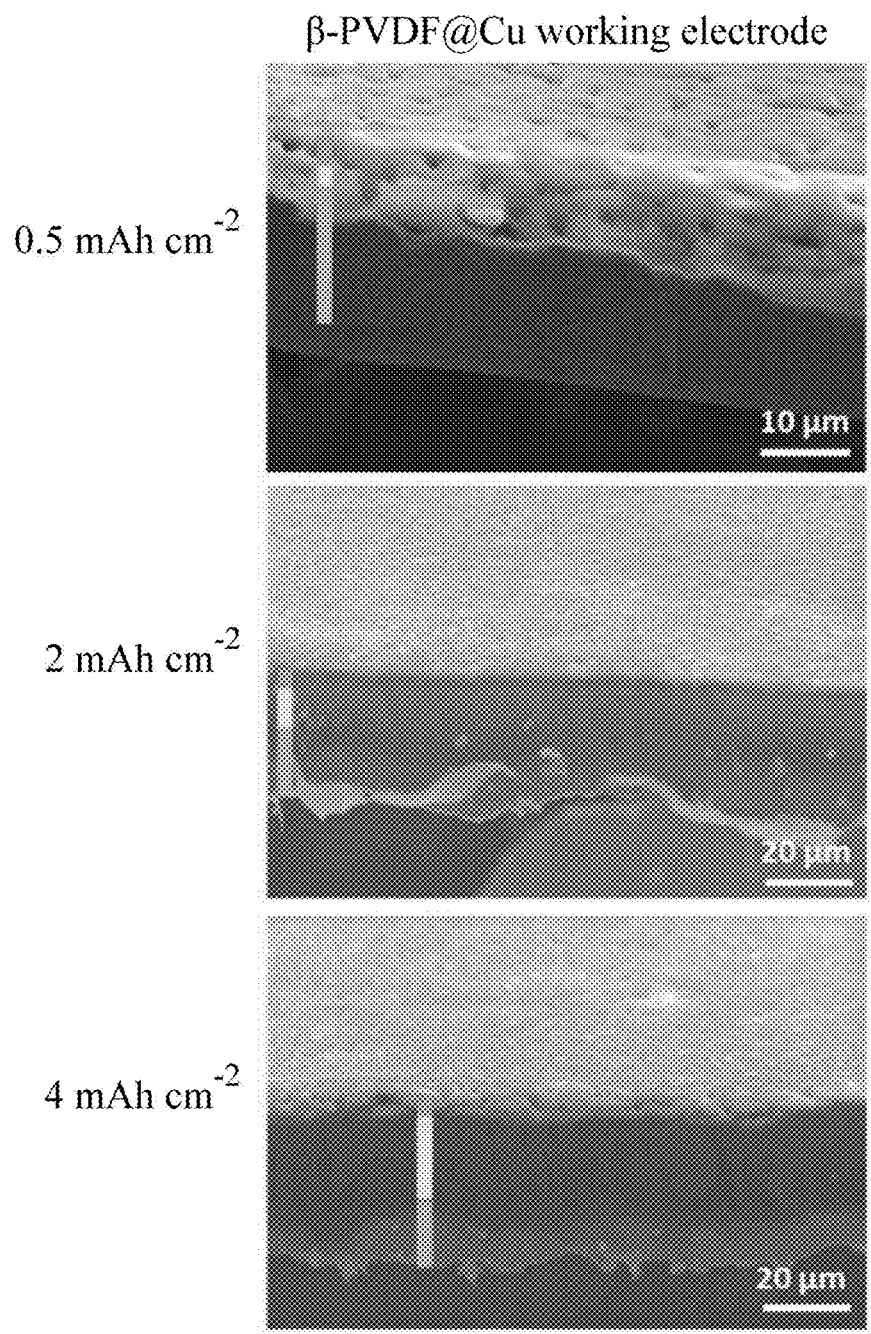
FIG. 3B shows SEM photographs of a β-pVDF@Cu working electrode with a lithium layer deposited thereon with different capacity in some embodiments of the disclosure.
Figure 3C:
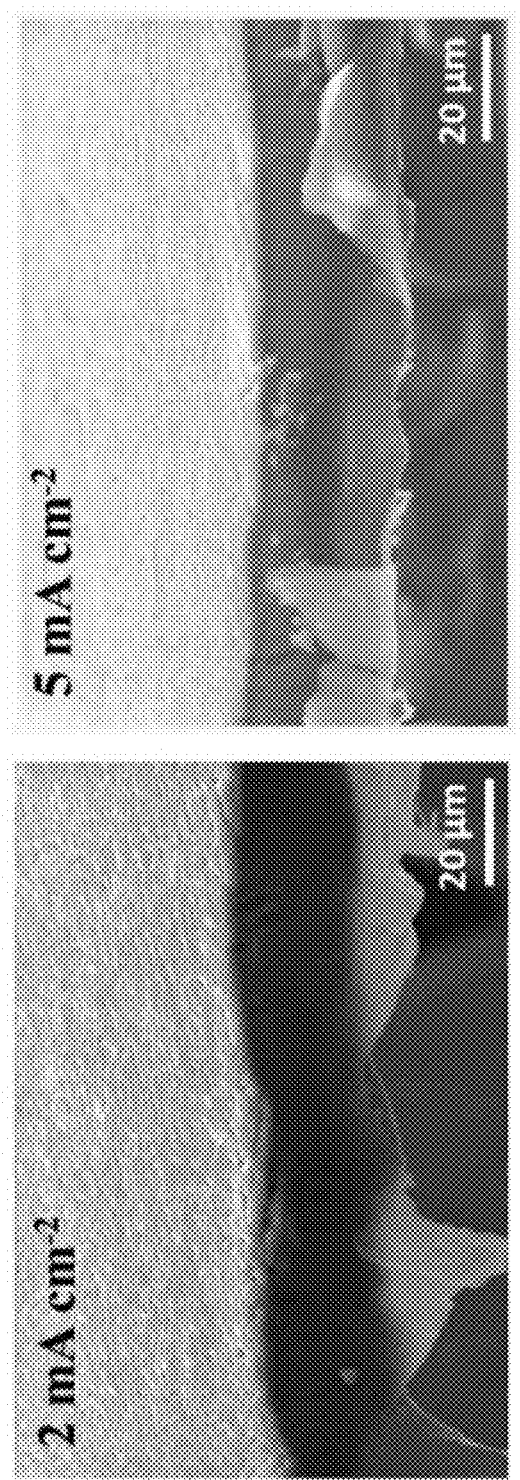
FIG. 3C shows SEM photographs of a β-PVDF@Cu working electrode with a lithium layer deposited thereon under different current density in some embodiments of the disclosure.

Example 2 was similar to Example 1, and the difference in Example 2 being that the copper foil having a thickness of 15 micrometers was replaced with the disc samples β-pVDF@Cu in Preparation Example 1. The counter electrode, the separator film, the electrolyte, and the structure of the coin cell in Example 2 were similar to those in Example 1. A current density of 1 mAcm$^{-2}$ with capacity loadings of 0.5, 2, and 4 mAhcm$^{-2}$ was respectively applied to deposit lithium onto the working electrodes of the cells, and a counter voltage of 1 V was applied to strip the lithium on the working electrodes to complete a cycle. The lithium deposited on the working electrode had smooth surface in all capacity loadings, and the cross-sectional structure was sequentially a top layer of the β-PVDF layer, a middle layer of densely deposited lithium, and a bottom layer of the copper foil. The thickness of the lithium middle layer was ranged in a theoretical value. For example, the lithium middle layer had a thickness of about 10 micrometers when the capacity loading was 2 mAhcm$^{-2}$. Note that the thickness of the β-PVDF layer was merely a small part of the thickness of the lithium middle layer. For example, the thickness of the β-PVDF layer was 20% of the thickness of the lithium middle layer when the capacity loading was 4 mAhcm$^{-2}$. The above structures were shown in FIG. 3B. The complete morphology preservation of the β-PVDF layer indicated sufficient flexibility and mechanical strength to withstand large volumetric changes. Even at high current densities of 2 to 5 mAcm$^{-2}$ (capacity loading was 2 mAhcm$^{-2}$), a smooth surface morphology with no dendrite was achieved on the β-pVDF@Cu working electrode, as shown in FIG. 3C.

After applying the current density of 1 mAcm$^{-2}$ with capacity loadings of 0.5, 2, and 4 mAhcm$^{-2}$ to deposit the lithium onto the working electrodes, and a counter voltage of 1 V was applied to strip the lithium on the working electrodes to complete a cycle. The cycling stability can be represented by columbic efficiency, which is defined by ratios of the stripped lithium amount and the deposited lithium amount in every cycle. As shown in FIG. 4A, the lithium deposition of each cycle was performed by a capacity loading of 0.5 mAhcm$^{-2}$ and a current density of 1 mAcm$^{-2}$. The columbic efficiency of the cell utilizing the β-PVDF@Cu working electrode was about 98% in 10 cycles, and was stable after 200 cycles. The voltage hysteresis of the cell utilizing the β-PVDF@Cu working electrode was stably maintained at 33 mV after several cycles (see FIG. 4B). The voltage curve of the cell utilizing the β-pVDF@Cu working electrode was not changed after several cycles (see FIG. 4C). The β-PVDF layer could form an ultra-stable interface between the electrode and the electrolyte.

As shown in FIG. 4D, the lithium deposition of each cycle was performed by a capacity loading of 0.5 mAhcm$^{-2}$ and current densities of 2 mAcm$^{-2}$ and 5 mAcm$^{-2}$, respectively. In FIG. 4D, the cells utilizing the β-PVDF@Cu working electrode had stable columbic efficiencies (96.5% and 92.5%, respectively), which are obviously better than the columbic efficiencies of the cells utilizing the copper foil working electrode.

Figure 4E:
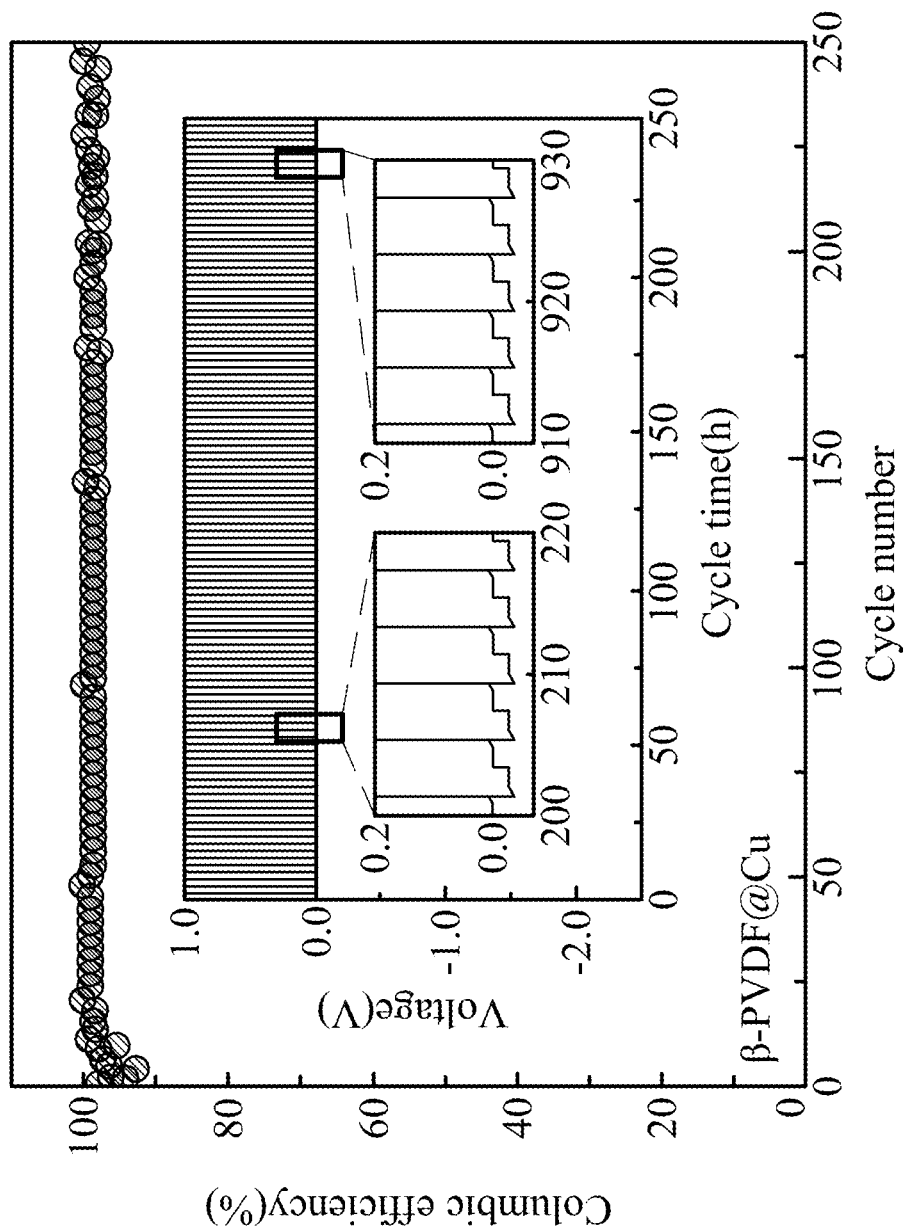
FIG. 4E shows columbic efficiencies (and a plot of voltage versus cycling period) of the cell utilizing the β-PVDF@Cu working electrode after a test of several cycles in some embodiments of the disclosure.

As shown in FIG. 4E, the lithium deposition of each cycle was performed by a capacity loading of 2 mAhcm$^{-2}$ and a current density of 1 mAcm$^{-2}$. The cell utilizing the β-PVDF@Cu working electrode still had a stable columbic efficiency after cycling for a long time. Even if the capacity loading was increased to 2 mAhcm$^{-2}$, the average columbic efficiency of the cell utilizing the β-PVDF@Cu working electrode after 250 cycles at a current density of 1 mAcm$^{-2}$ was 98.7% (highly stable cycling performance), as shown in FIG. 4E. The smooth and flat voltage plateau curve in FIG. 4E also represents the stable dynamics in the cycles.

Figure 5A:
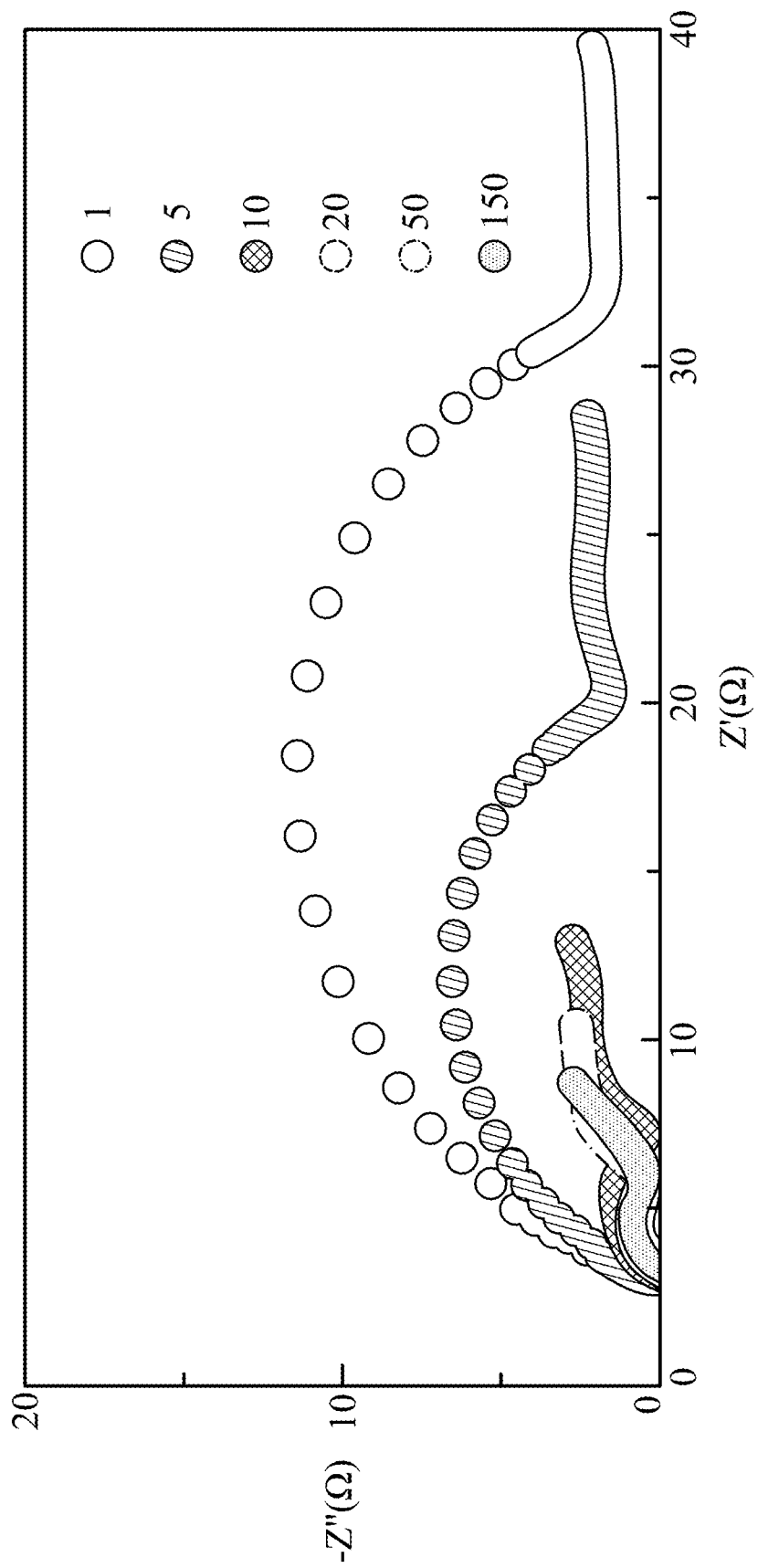
FIG. 5A shows an electrochemical impedance spectrum of the cell utilizing the β-PVDF@Cu working electrode after a test of several cycles in some embodiments of the disclosure.
Figure 5B:
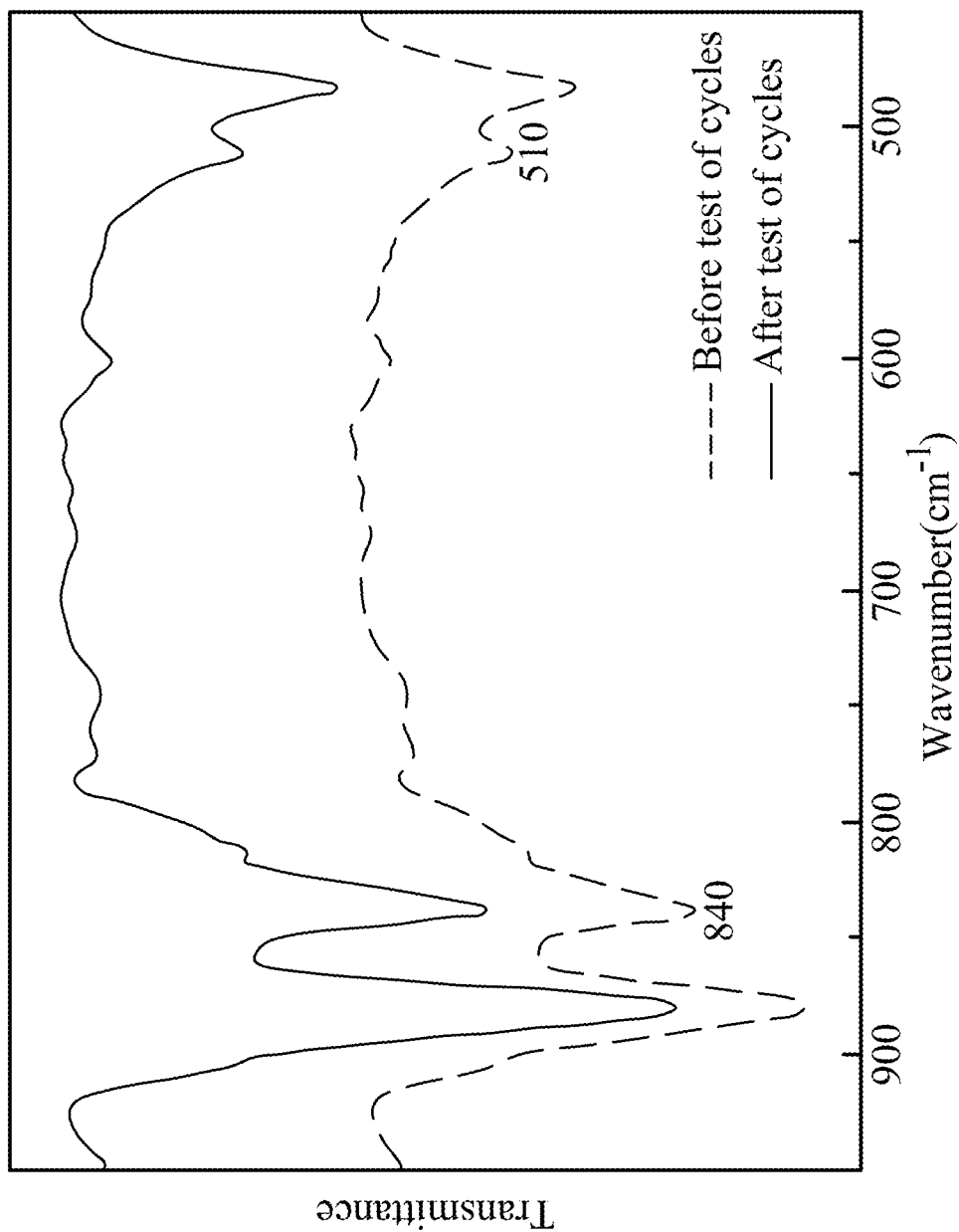
FIG. 5B shows FTIR spectra of the β-PVDF layer before and after a test of several cycles in some embodiments of the disclosure.
Figure 5C:
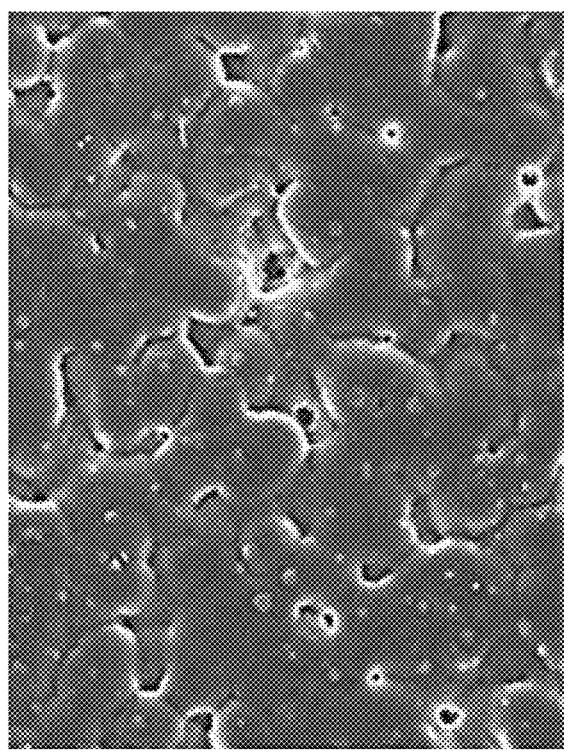
FIG. 5C shows a SEM photograph of the β-PVDF layer after a test of several cycles in some embodiments of the disclosure.

Electrochemical impedance spectra were collected at open circuit potential (OCP) using an frequency analyzer (Metrohm Autolab/PGSTAT30) in a frequency range from 100 kHz to 0.1 Hz with an amplitude of 10 mV. AC impedance analysis confirmed that the cell utilizing the β-PVDF@Cu working electrode could keep a low charge transfer resistance over cycles (the lithium deposition of each cycle was performed by a capacity loading of 2 mAhcm$^{-2}$ and a current density of 1 mAcm$^{-2}$), as shown in FIG. 5A. The cycle was repeated 250 times, and the β-PVDF layer was taken from the cell for analysis to check whether the chemical and mechanical properties of the β-PVDF layer changed. The FTIR spectra of the β-PVDF layer before and after the test of several cycles are shown in FIG. 5B, which proves that the chemical structure of the β-PVDF layer after the test of the cycles does not change. The SEM photograph of the β-PVDF layer after the test of the cycles is shown in FIG. 5C, which proves that the micro-structure of the β-PVDF layer after the test of the cycles does not change.

Example 3

Example 3 was similar to Example 1, and the difference in Example 3 being that the copper foil having a thickness of 15 micrometers was replaced with the disc samples α-PVDF@Cu in Preparation Example 2. The counter electrode, the separator film, the electrolyte, and the structure of the coin cell in Example 3 were similar to those in Example 1.

A current density of 1 mAcm$^{-2}$ with capacity loadings of 0.5, 2, and 4 mAhcm$^{-2}$ was respectively applied to deposit lithium onto the working electrodes of the cells, and a counter voltage of 1 V was applied to strip the lithium on the working electrodes to complete a cycle. As shown in FIG. 4A, the lithium deposition of each cycle was performed by a capacity loading of 0.5 mAhcm$^{-2}$ and current density of 1 mAcm$^{-2}$. The columbic efficiencies of the cell utilizing the α-PVDF@Cu working electrode were lower than the columbic efficiencies of the cell utilizing the copper foil working electrode and the cell utilizing the β-PVDF@Cu working electrode in the first 50 cycles. Although the columbic efficiencies of the cell utilizing the α-PVDF@Cu working electrode were gradually increased after the several cycles, the voltage hysteresis of the cell utilizing the α-PVDF@Cu working electrode was still higher than that of the cell utilizing the β-PVDF@Cu working electrode, as shown in FIG. 4B. It means that the cell utilizing the α-PVDF@Cu working electrode had a substantially higher overall charge transfer resistance. As shown in the comparison between Examples 2 and 3, the cell utilizing the β-PVDF@Cu working electrode had a better performance than the cell utilizing the α-PVDF@Cu working electrode. In other words, the phase of the PVDF layer is important.

Preparation Example 3 (β-PVDF@Li)

PVDF (Kynar® HSV900 commercially available from Arkema Inc.) was dissolved in dimethylacetamide (DMAc) at room temperature to form a 10 wt % PVDF solution. The PVDF solution was coated onto a lithium foil having a thickness of 300 micrometers and a diameter of 16 mm by an automatic blade coater (B0100 commercially available from Allreal), and then put into a dry box filled with argon to be heated to 65° C. and kept at 65° C. for 90 minutes, and then vacuumed at room temperature overnight to remove the DMAc. In addition, this step may ensure the PVDF layer be β-phase. The β-phase PVDF layer (β-PVDF layer) had a thickness of about 4 micrometers.

A lithium iron phosphate (LFP) positive electrode was prepared as below. 20 parts by weight of lithium iron phosphate (commercially available from Advanced Lithium Electrochemistry Co., Ltd.), 2 parts by weight of PVDF, 1 parts by weight of graphite sheet (KS-6, commercially available from TIMICAL) and 2 parts by weight of carbon black (super P, commercially available from TIMICAL) were mixed in N-methyl-2-pyrrolidone (NMP) to prepare the LFP positive electrode. The mass loading of the LFP was 4.0 mgcm$^{-2}$.

A commercially available carbonate solution was selected as an electrolyte, which included 1.2 M LiPF$_6$ in ethylene carbonate (EC)/dimethyl carbonate (DMC) (v/v=1/2) with 4 wt % fluoroethylne carbonate (FEC) additive.

Figure 6A:
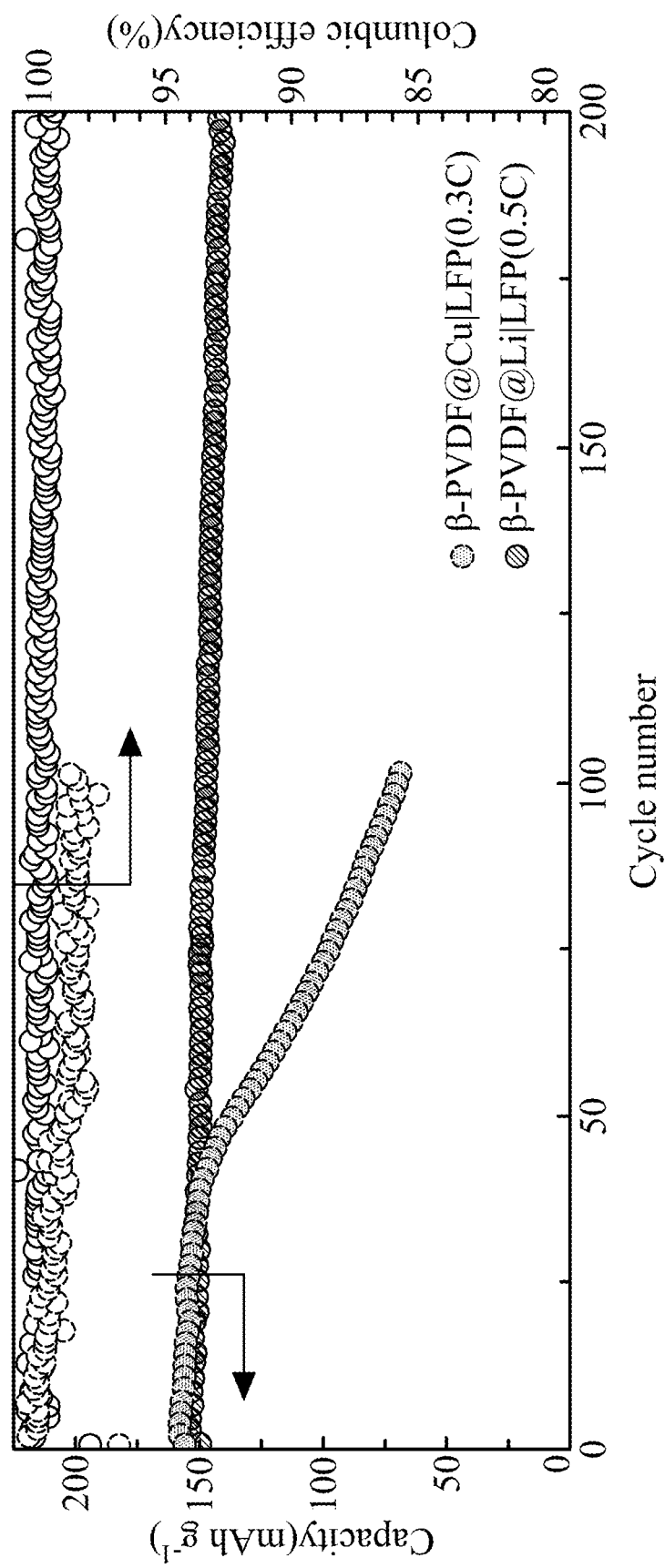
FIG. 6A shows columbic efficiencies of different cells after a test of several cycles in some embodiments of the disclosure.
Figure 6B:
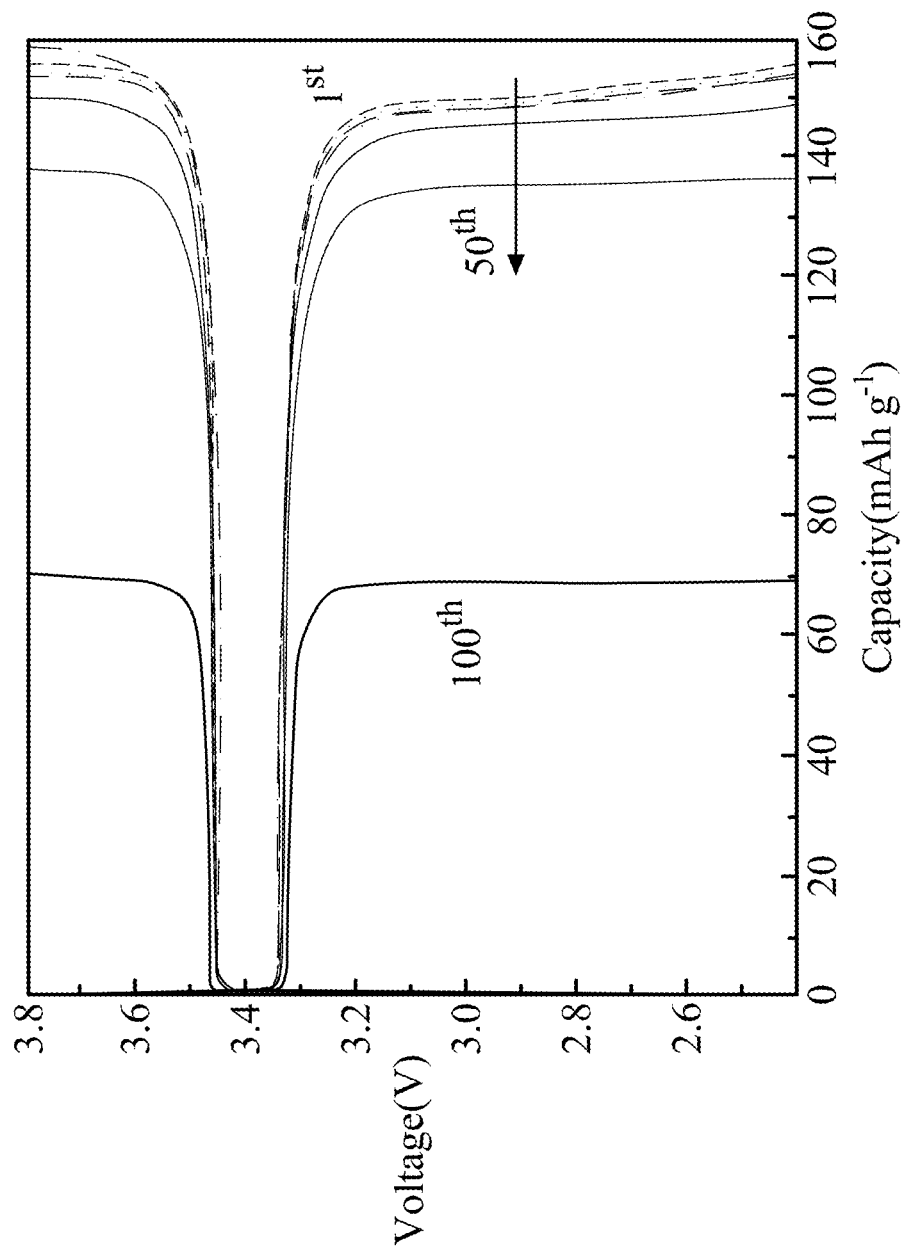
FIG. 6B shows curves of voltage versus capacity of the cell utilizing the β-PVDF@Cu negative electrode after a test of several cycles in some embodiments of the disclosure.

The β-PVDF@Cu in Example 2 was selected as a negative electrode, which is pre-applied a capacity loading of 1 mAhcm$^{-2}$ in a lithium ionic solution. The treated β-PVDF@Cu negative electrode was collocated with the LFP positive electrode, and the commercially available electrolyte was added into the space between the positive electrode and the negative electrode to complete a cell. The cell was cycled between 2.5 V and 3.8 V. When the current density was 0.3 C, the cycling performance of the cell utilizing the β-PVDF@Cu negative electrode had two stages of stability, as shown in FIG. 6A. The capacity fading rate of the cell utilizing the β-PVDF@Cu negative electrode was very low (about −0.11% per cycle) in first 40 cycles, but was very fast (about −0.84% per cycle) in following cycles. Nevertheless, there was essentially no change in voltage polarization of the cell utilizing the β-PVDF@Cu negative electrode after cycles of 0.3 C (1 C=170 mAhg$^{-1}$), as shown in FIG. 6B, suggesting invariant charge-transfer resistance. Therefore, the accelerated capacity loss beyond 40 cycles resulted primarily from the insufficient Li inventory at the negative electrode (due to non-100% deposition/stripping columbic efficiency of the negative electrode) rather than interfacial instability.

Figure 6C:
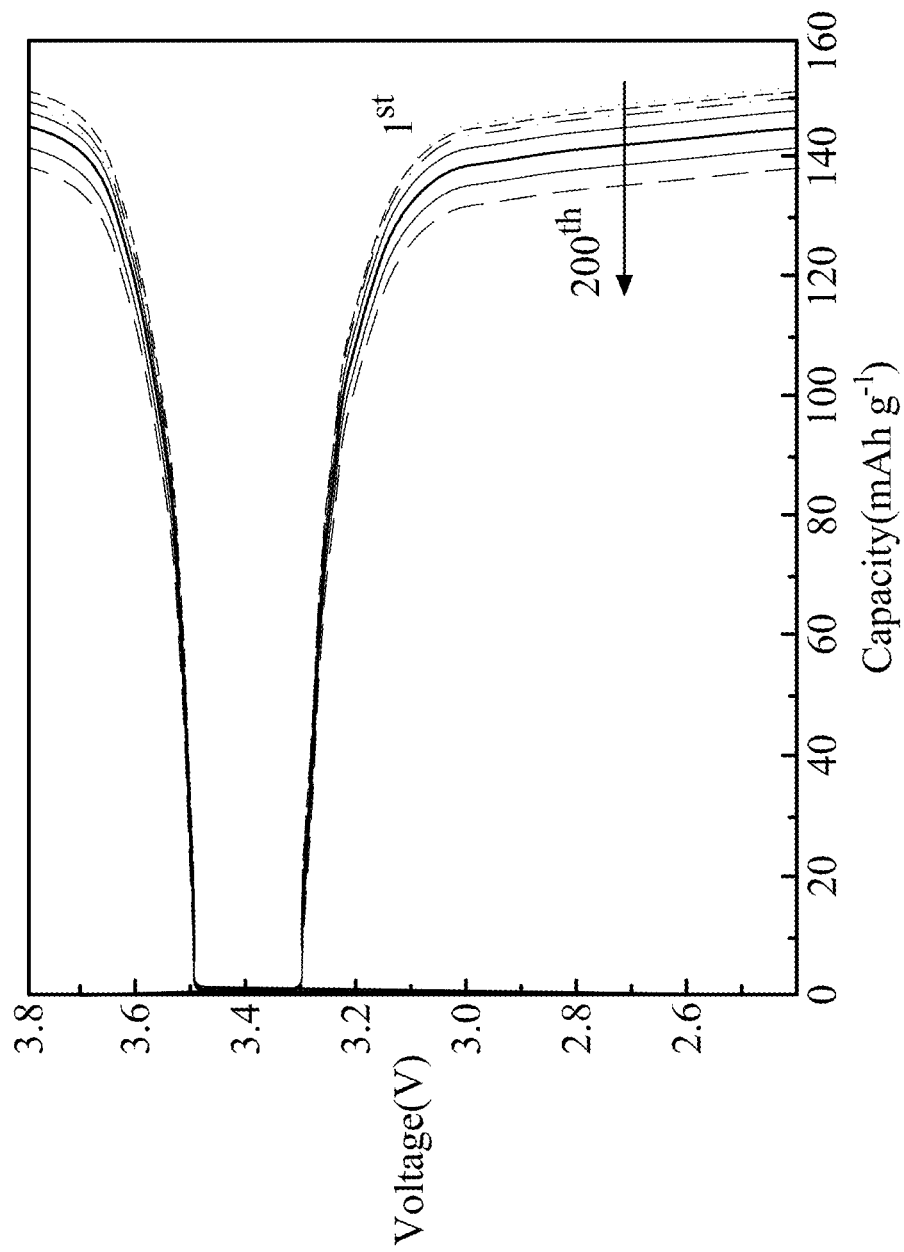
FIG. 6C shows curves of voltage versus capacity of the cell utilizing the β-PVDF@Li negative electrode after a test of several cycles in some embodiments of the disclosure.

The β-PVDF@Li was selected as a negative electrode to collocate with the LFP positive electrode, and the commercially available electrolyte was added into the space between the positive electrode and the negative electrode to complete a cell. Because the β-PVDF@Li negative electrode had sufficient Li inventory, the cell utilizing the same had an excellent reversible capacity retention at 0.5 C. After 200 cycles, the capacity of the cell was maintained above 141 mAh g$^{-1}$ with capacity retention of 94.3% and a stable columbic efficiency of 99.85%. The voltage curves of the cell utilizing the β-PVDF@Li negative electrode show little change in voltage polarization of the cell at 0.5 C, as shown in FIG. 6C.

Figure 7A:
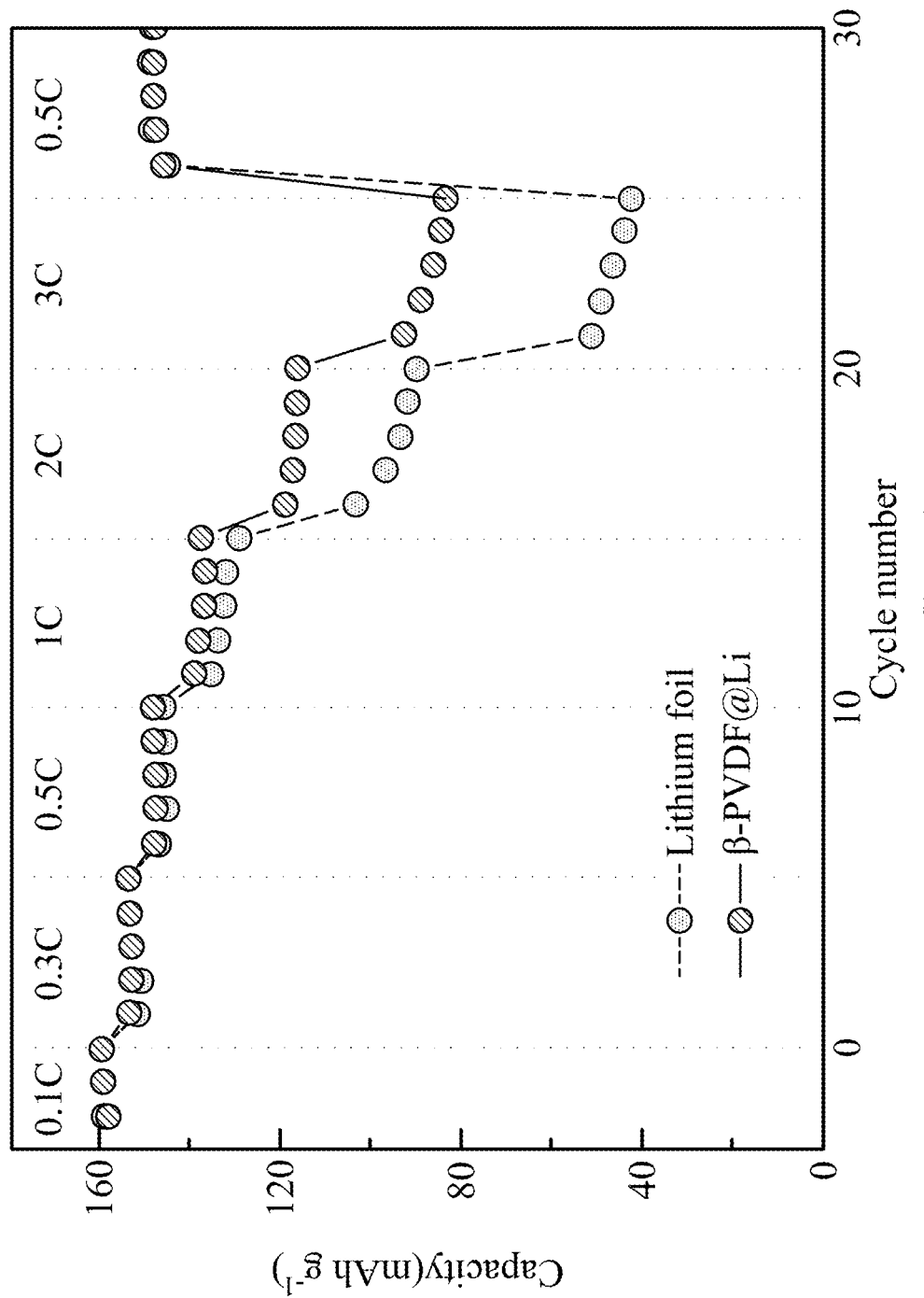
FIG. 7A shows the capacity retention of different cells after test of several cycles of different current densities in some embodiments of the disclosure.
Figure 7B:
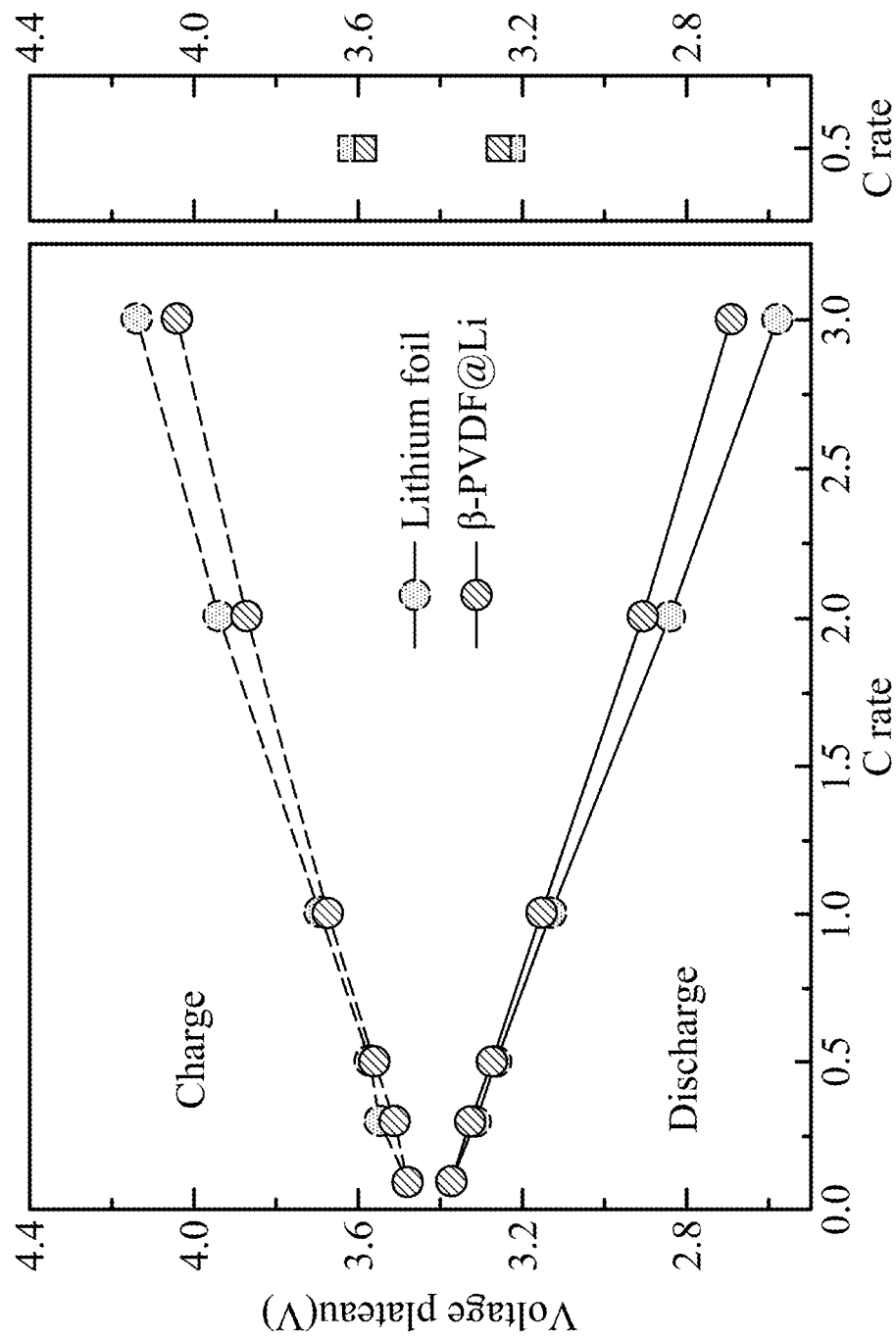
FIG. 7B shows plateau voltages of different cells after charge/discharge of different current densities in some embodiments of the disclosure.
Figure 7C:
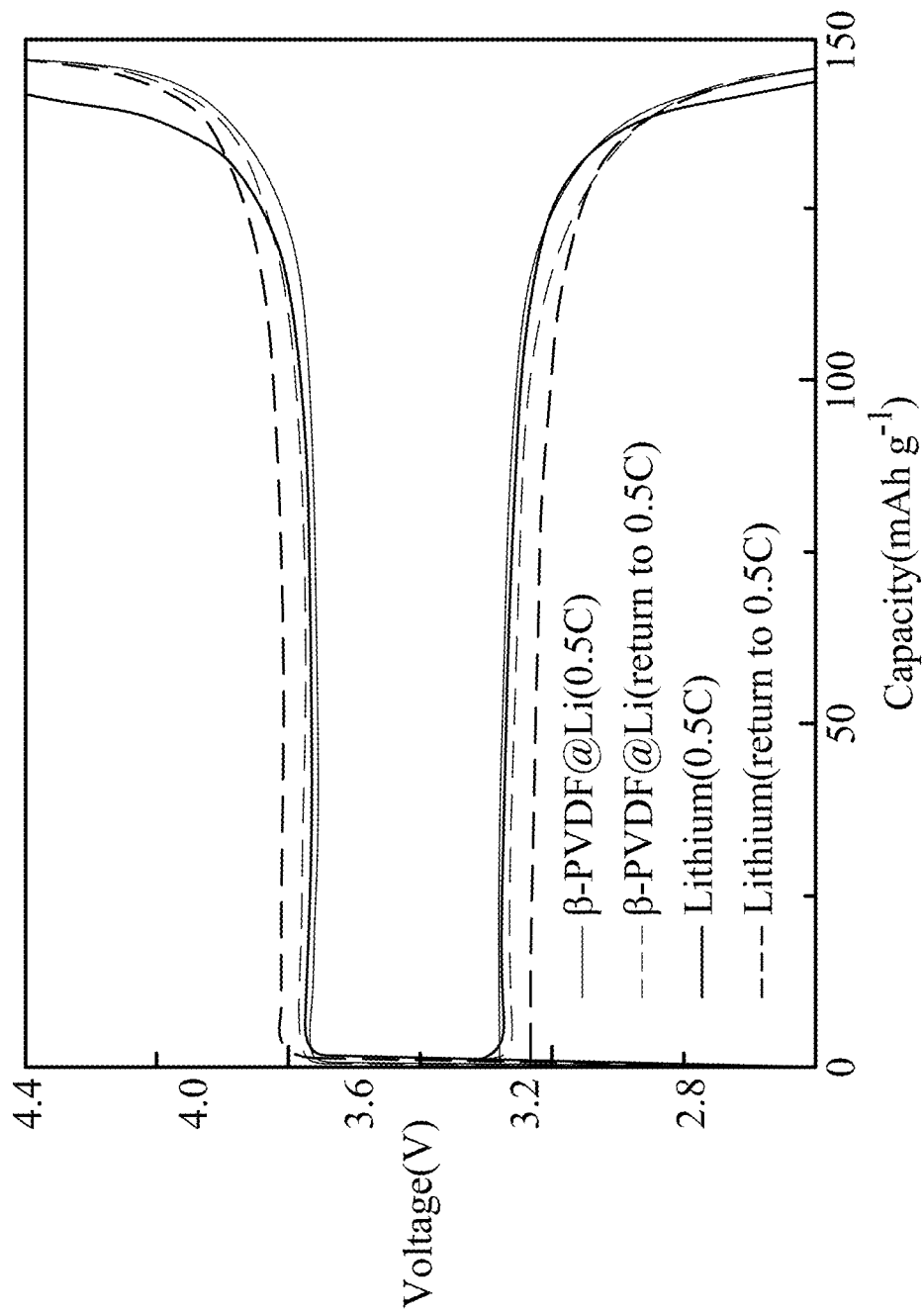
FIG. 7C shows charge/discharge curves of different cells in some embodiments of the disclosure.
Figure 7D:
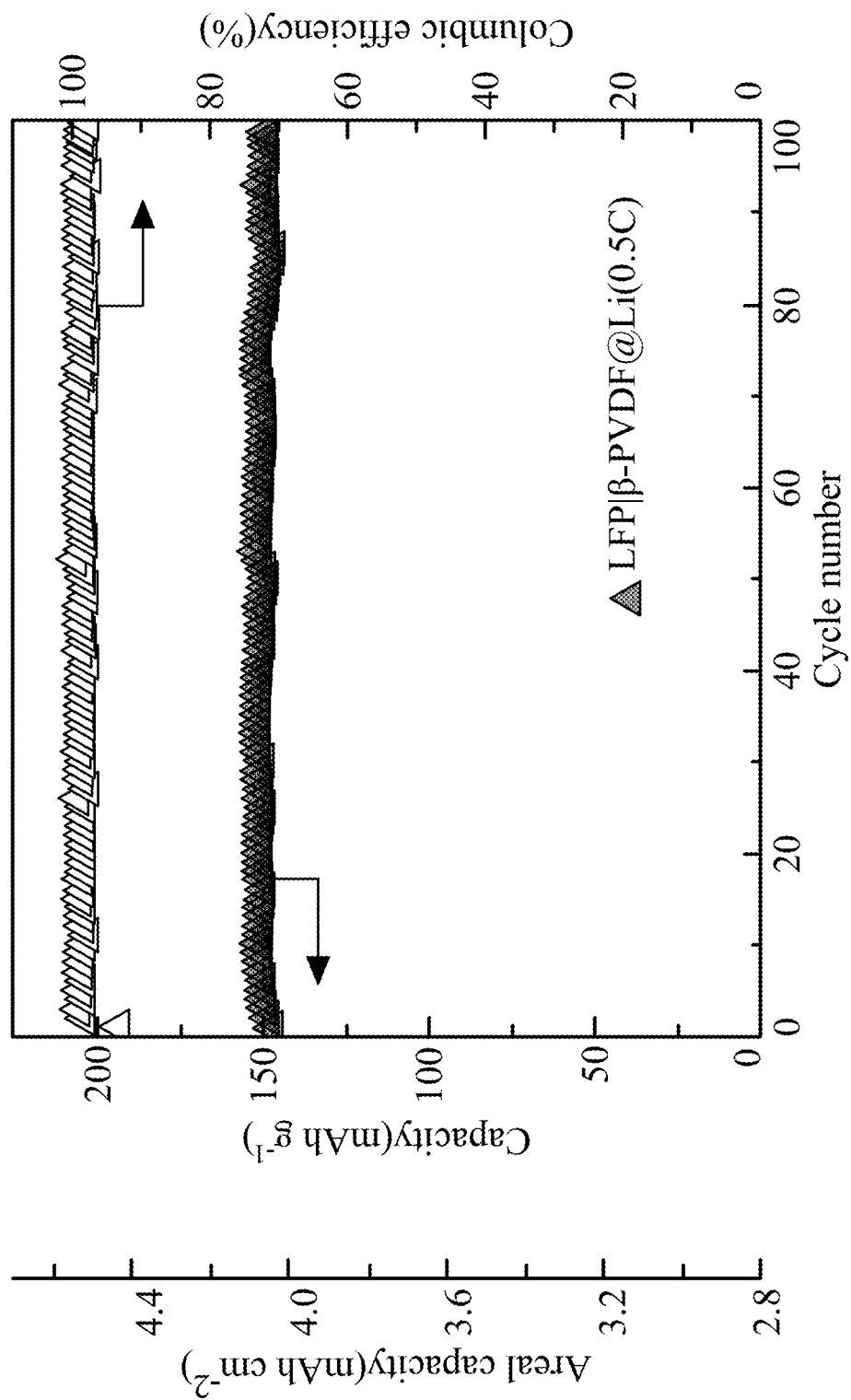
FIG. 7D shows capacities and columbic efficiencies of the cell utilizing the β-PVDF@Li negative electrode after a test of several cycles in some embodiments of the disclosure.

A lithium foil with a diameter of 16 mm was selected as a negative electrode to collocate with the LFP positive electrode (mass loading=10.5 mg cm$^{-2}$). Alternatively, β-PVDF@Li was selected as a negative electrode to collocate with the LFP positive electrode (mass loading=10.5 mg cm$^{-2}$). The commercially available electrolyte was added into the space between the positive electrode and the negative electrode to perform the same test of the cycles. As shown in FIG. 7A, the cell utilizing the lithium foil negative electrode had lower capacities after the test of the cycles of higher current densities (2 C and 3 C) in the rate performance test from 0.1 C to 3 C. As shown in FIG. 7B, the cell utilizing the lithium foil negative electrode had higher polarization at corresponding current rates than that of the cell utilizing the β-PVDF@Li negative electrode. The charge-discharge curves of the cells under the current density of 0.5 C were shown in FIG. 7C. The capacity and the columbic efficiencies of the cell utilizing the β-PVDF@Li negative electrode after the test of several cycles are shown in FIG. 7D. Accordingly, the cell utilizing the β-PVDF@Li negative electrode had excellent rate performance and capacity retention (e.g. 100% after 100 cycles).

Accordingly, the thin β-PVDF layer could be used to deposit a lithium layer without the Li dendrite, and improve the cycle performance at a high current density. The thin β-PVDF layer could ensure the high energy and capacity densities of the lithium negative electrode, and the coating process for manufacturing the same was beneficial to mass production.

Preparation Example 4 (β-PVDF@NG)

Figure 8A:
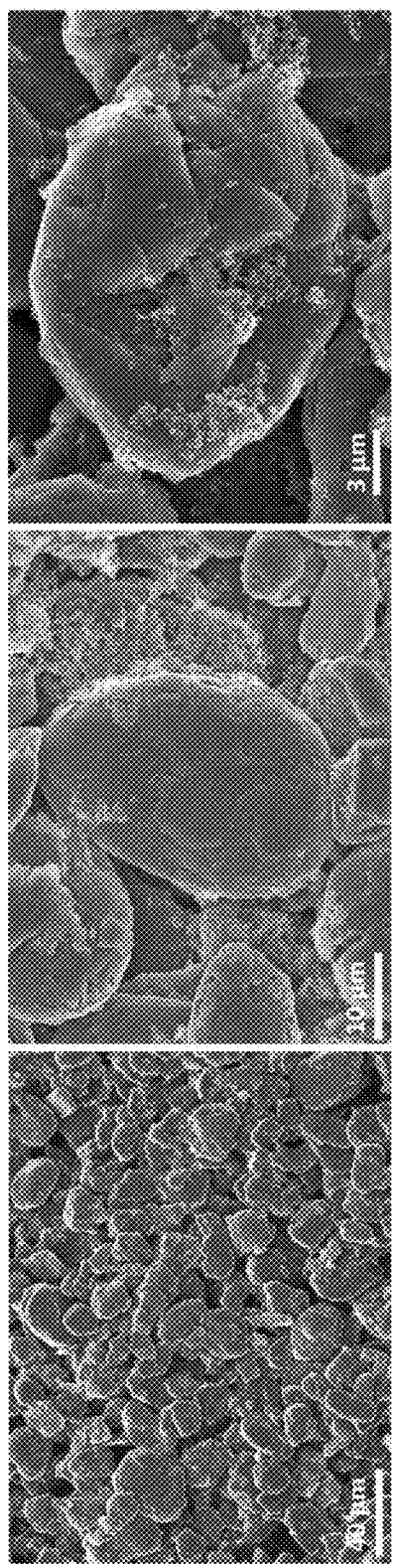
FIG. 8A shows SEM photographs of nature graphite in some embodiments of the disclosure.
Figure 8B:
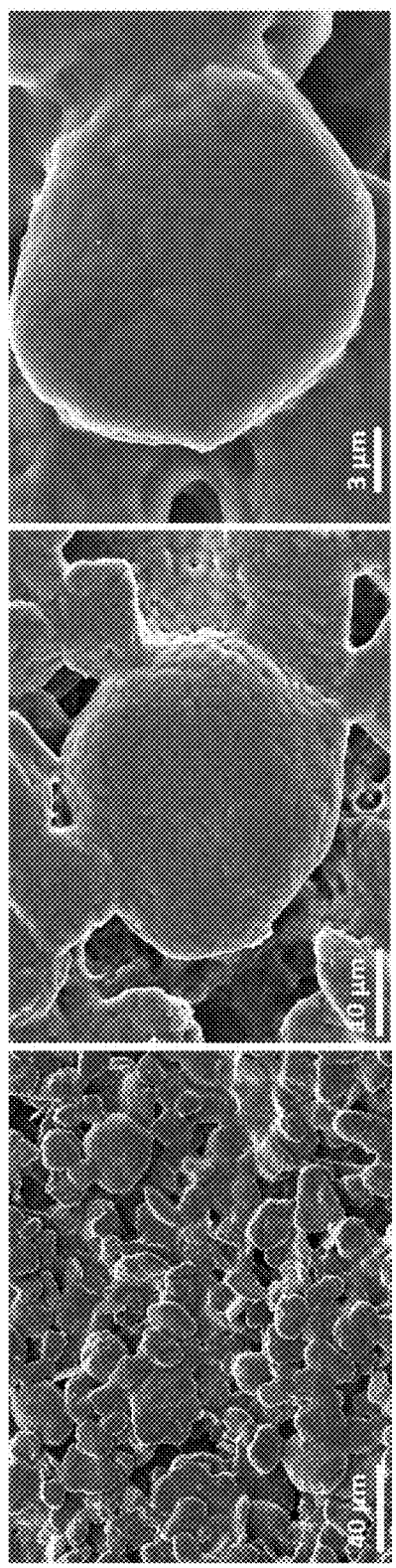
FIG. 8B shows SEM photographs of β-PVDF@NG in some embodiments of the disclosure.

PVDF (Kynar® HSV900 commercially available from Arkema Inc.) was dissolved in dimethylacetamide (DMAc) at room temperature to form a 10 wt % PVDF solution. The PVDF solution was coated onto a nature graphite electrode having a thickness of 15 micrometers by an automatic blade coater (B0100 commercially available from Allreal), and then put onto a hotplate to be heated to 65° C. and kept at 65° C. for 90 minutes to remove the DMAc. In addition, this step may ensure the PVDF layer be β-phase. The β-phase PVDF layer (β-PVDF layer) had a thickness of about 4 micrometers. SEM photographs of the nature graphite electrode without the PVDF coated thereon are shown in FIG. 8A, and SEM photographs of the nature graphite electrode with the β-PVDF layer coated thereon (β-PVDF@NG) are shown in FIG. 8B. In FIG. 8B, β-PVDF@NG had a layer evenly coated on the nature graphite, and the layer should be the β-PVDF layer.

Example 4

Figure 9A:
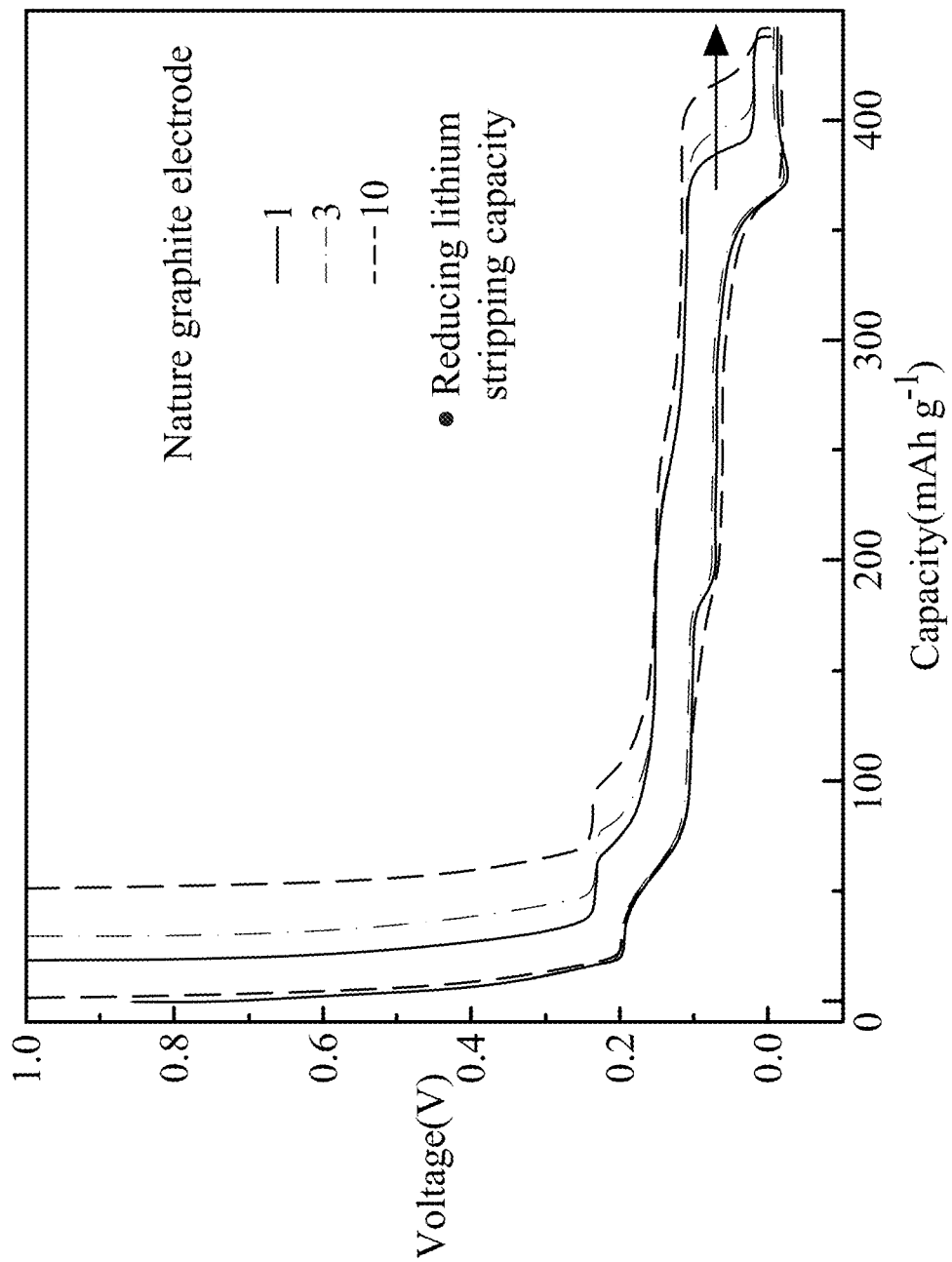
FIG. 9A shows curves of voltage versus capacity of the cell utilizing the nature graphite negative electrode after a test of several cycles in some embodiments of the disclosure.
Figure 10A:
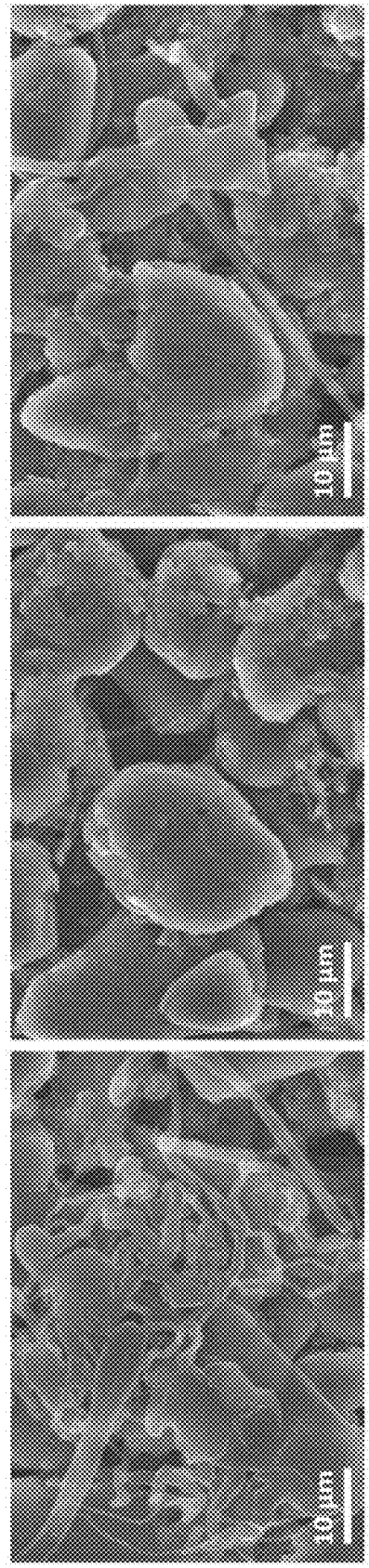
FIG. 10A shows SEM photographs of the nature graphite negative electrode after a test of several cycles in some embodiments of the disclosure.

Example 4 was similar to Example 1, and the difference in Example 4 being that the copper foil having a thickness of 15 micrometers was replaced with the nature graphite electrode without PVDF layer. The counter electrode, the separator film, the electrolyte, and the structure of the coin cell in Example 4 were similar to those in Example 1. The cell was 20% over-lithiated by a constant voltage, and a test of charge/discharge cycles at a current density of 0.2 C was performed to the cell, as shown in FIG. 9A. The lithium stripping capacity was lower after per cycle, it means that the columbic efficiency of the cell was reduced after the test of the cycles. SEM photographs of the nature graphite electrode after the 20% over-lithiation and the test of charge/discharge cycles are shown in FIG. 10A. Obviously, lithium dendrite was grown on the surface of the nature graphite electrode.

Example 5

Figure 9B:
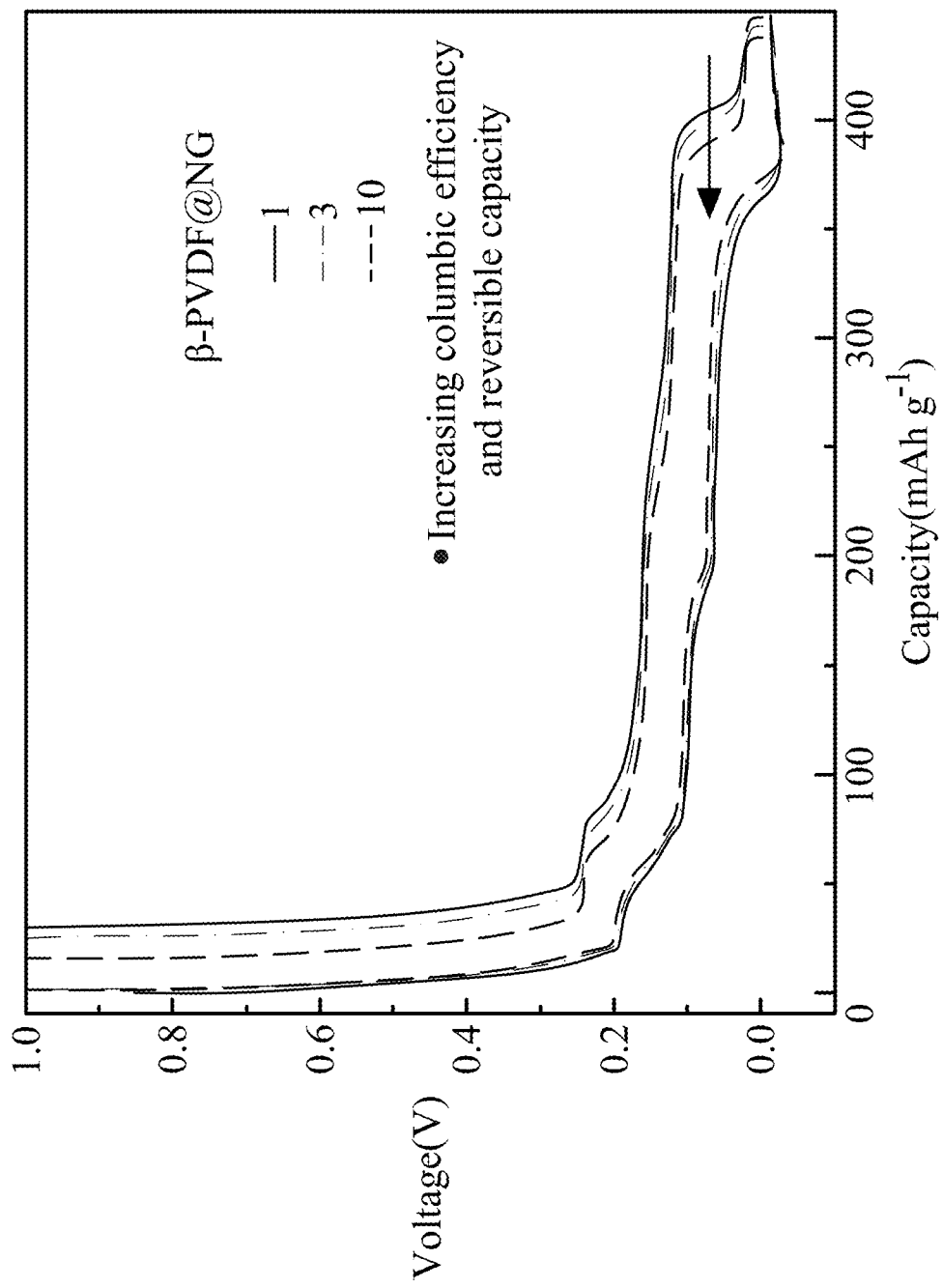
FIG. 9B shows curves of voltage versus capacity of the cell utilizing the β-PVDF@NG negative electrode after a test of several cycles in some embodiments of the disclosure.
Figure 9C:
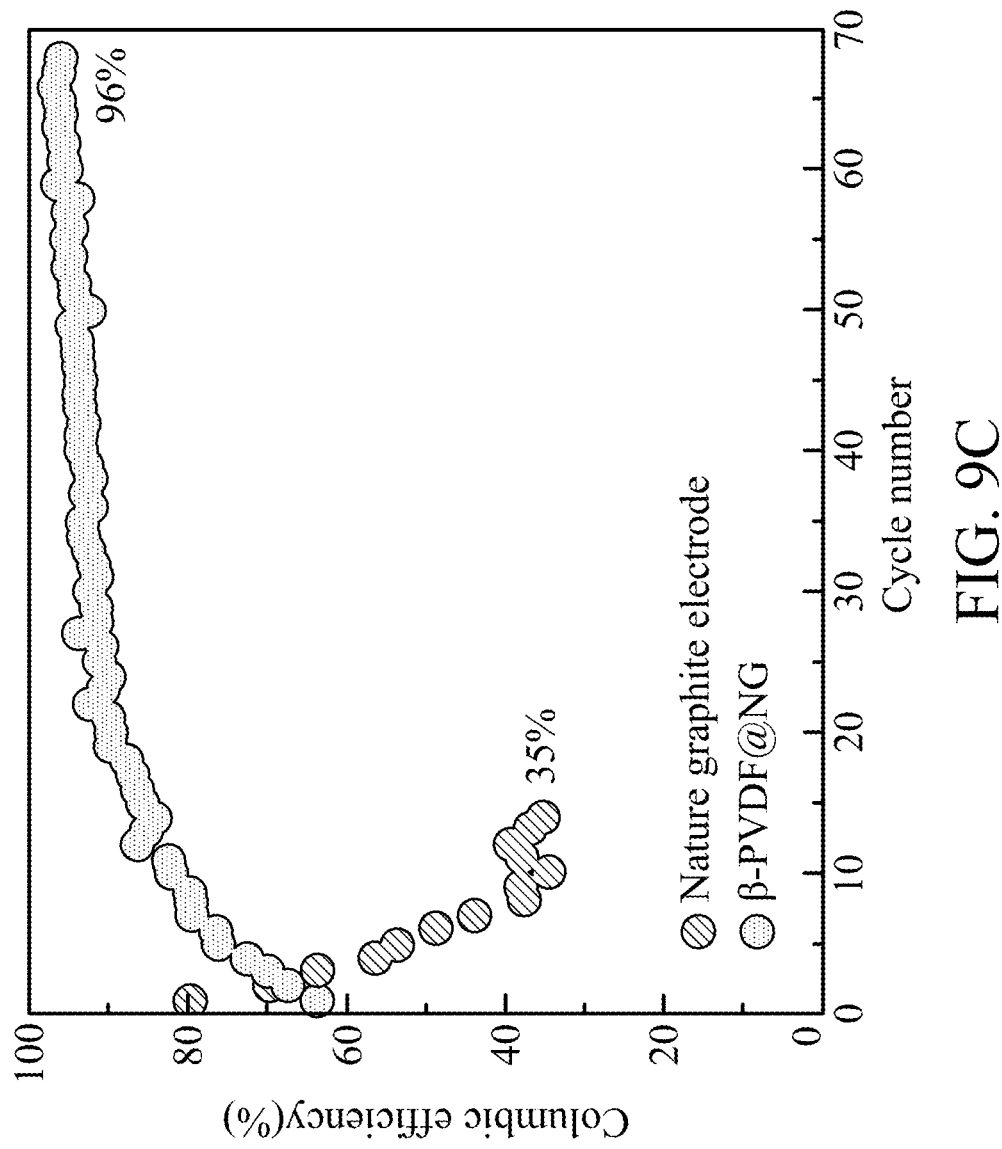
FIG. 9C shows columbic efficiencies of different cells after a test of several cycles in some embodiments of the disclosure.
Figure 10B:
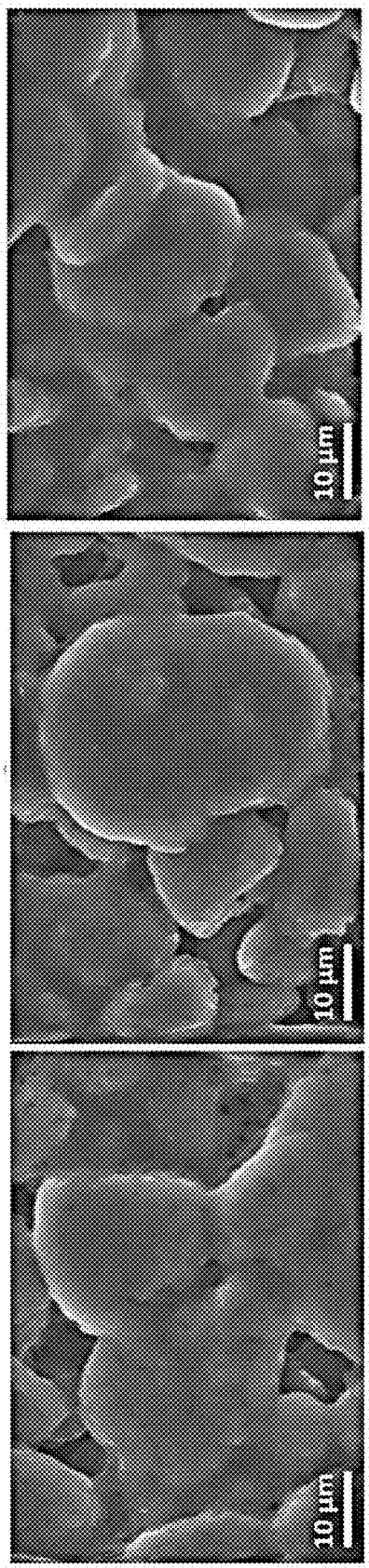
FIG. 10B shows SEM photographs of the β-pVDF@NG negative electrode after a test of several cycles in some embodiments of the disclosure.

Example 5 was similar to Example 1, and the difference in Example 5 being that the copper foil having a thickness of 15 micrometers was replaced with the β-PVDF@NG in Preparation Example 4. The counter electrode, the separator film, the electrolyte, and the structure of the coin cell in Example 5 were similar to those in Example 1. The cell was 20% over-lithiated by a constant voltage, and a charge/discharge cycling test at a current density of 0.2 C was performed to the cell, as shown in FIG. 9B. The lithium stripping capacity was increased after per cycle, it means that the columbic efficiency of the cell was enhanced after the test of the cycles. As shown in the comparison of FIG. 9C, the cell utilizing the β-PVDF@NG negative electrode had columbic efficiency greatly larger than that of the cell utilizing the nature graphite negative electrode after a test of several cycles. SEM photographs of the β-PVDF@NG negative electrode after the 20% over-lithiation and the test of charge/discharge cycles are shown in FIG. 10B. No lithium dendrite was grown on the surface of the β-PVDF@NG negative electrode, which proves that the β-PVDF layer may inhibit the lithium dendrite growth.

Figure 11A:
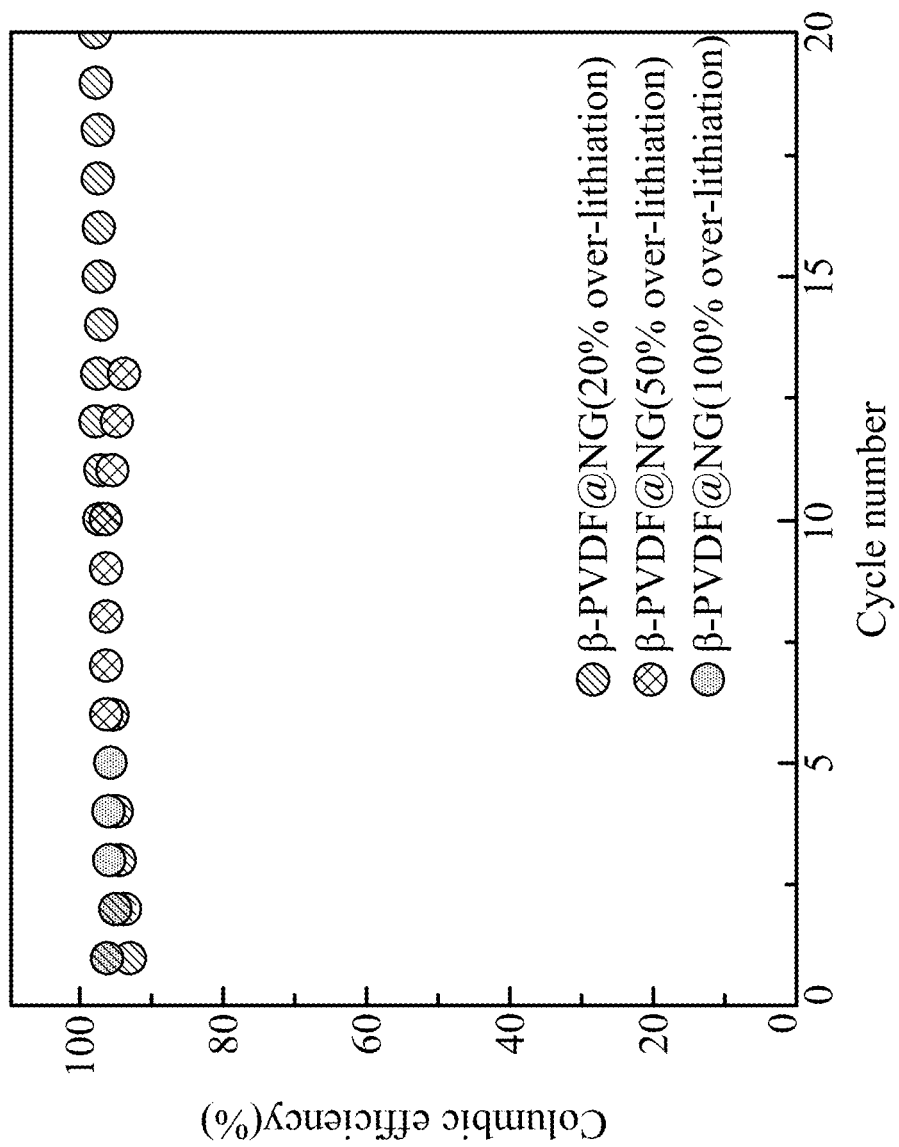
FIG. 11A shows columbic efficiencies of the cell utilizing the β-PVDF@NG negative electrode after over-lithiation and a test of several cycles in some embodiments of the disclosure.
Figure 11B:
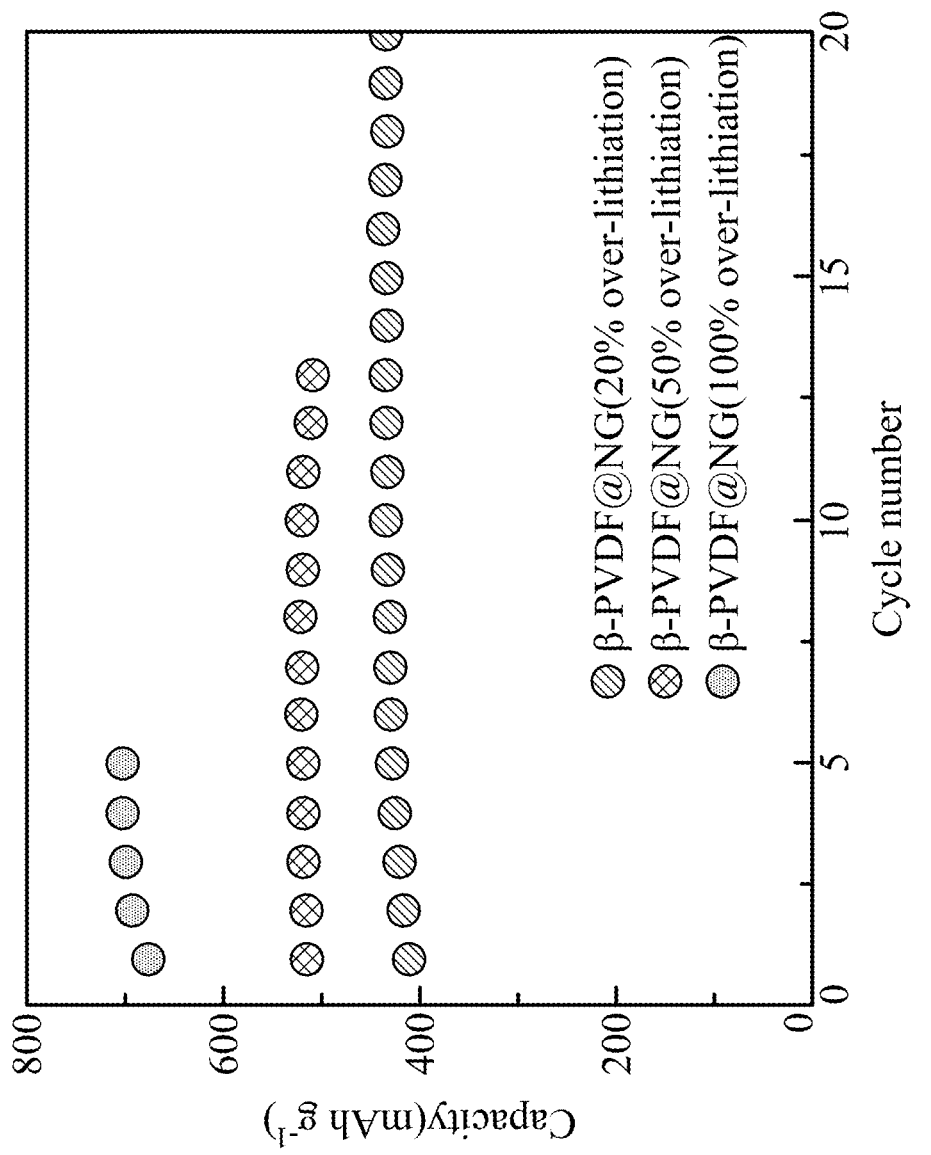
FIG. 11B shows capacities of the cell utilizing the β-PVDF@NG negative electrode after over-lithiation and a test of several cycles in some embodiments of the disclosure.

The cell was 20%, 50%, or 100% over-lithiated by a constant voltage, and a charge/discharge cycling test at a current density of 0.2 C was performed to the cell, as shown in FIG. 11A. Whatever the over-lithiation degree was, the columbic efficiency of the cell could be kept over 95%. However, the 20% over-lithiated cell had a better cycling stability, as shown in FIG. 11B.

Preparation Example 5 (β-PVDF@Cu)

Figure 12:
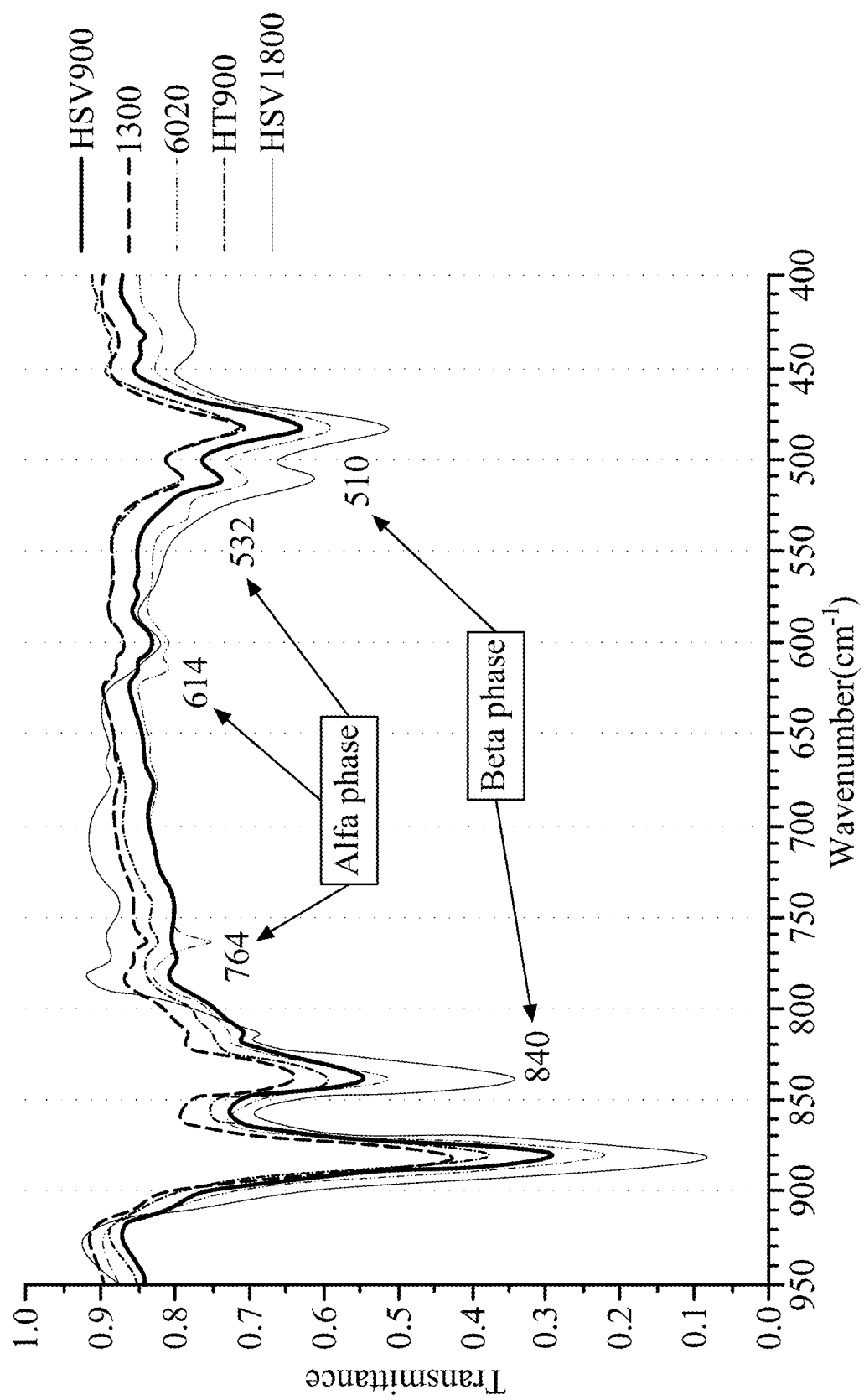
FIG. 12 shows FTIR spectra of β-PVDF layers from different sources in some embodiments of the disclosure.

Polyvinylidene difluoride (PVDF, Kynar® HSV900 and Kynar® HSV1800 commercially available from Arkema Inc., Hylar® 1300 and Solef® 6020 commercially available from Solvay, and ATROX™ HT900 commercially available from Tchno Alpha Co., Ltd.) were respectively dissolved in dimethylacetamide (DMAc) at room temperature to form different 10 wt % PVDF solutions. The PVDF solutions were respectively coated onto copper foils having a thickness of 15 micrometers by an automatic blade coater (B0100 commercially available from Allreal), and then put onto a hot plate to be heated to 65° C. and kept at 65° C. for 90 minutes to remove the DMAc. In addition, this step may ensure the PVDF layers be β-phase. The FTIR spectra of the β-PVDF layers are shown in FIG. 12. Signal intensity at 840 $cm^{-1}$ served as signal intensity of β-PVDF, signal intensity at 764 $cm^{-1}$ served as signal intensity of α-PVDF, and the signal intensity ratios of β-PVDF to α-PVDF ($I_{840}/I_{764}$) were calculated as shown in Table 1.

TABLE 1

| Company | Brand | β (%) | α (%) |
|---|---|---|---|
| Arkema Inc. | Kynar ® HSV900 | 81.8 | 18.2 |
| Solvay S.A. | Hylar ® 1300 | 80.0 | 20.0 |
| Solvay S.A. | Solef ® 6020 | 71.4 | 28.6 |
| Techno Alpha Co., Ltd. | ATROX ™ HT900 | 76.9 | 23.1 |
| Arkema Inc. | Kynar ® HSV1800 | 92.9 | 7.1 |

It will be apparent to those skilled in the art that various modifications and variations can be made to the disclosed methods and materials. It is intended that the specification and examples be considered as exemplary only, with the true scope of the disclosure being indicated by the following claims and their equivalents.

What is claimed is:

1. A negative electrode, comprising:
a current collector; and
a β-phase-based polyvinylidene fluoride layer coating on the current collector,
wherein the β-phase-based polyvinylidene fluoride layer has a thickness of 1 μm to 10 μm,
wherein the β-phase-based polyvinylidene fluoride layer has an FTIR spectrum, in which signal intensity at 840 $cm^{-1}$ serves as signal intensity of β-phase polyvinylidene fluoride, signal intensity at 764 $cm^{-1}$ serves as signal intensity of α-phase polyvinylidene fluoride, and the signal intensity of β-phase polyvinylidene fluoride and the signal intensity of α-phase polyvinylidene fluoride have a ratio of 70:30 to 95:5, and
wherein the β-phase-based polyvinylidene fluoride layer consists of polyvinylidene fluoride.

2. The negative electrode as claimed in claim 1, wherein the current collector comprises lithium, copper, aluminum, nickel, stainless steel, or graphite.

3. The negative electrode as claimed in claim 1, further comprising an active material disposed between the current collector and the β-phase-based polyvinylidene fluoride layer, and the composition of the active material is different from the composition of the current collector.

4. The negative electrode as claimed in claim 3, wherein the active material comprises graphite, silicon, $Li_4Ti_5O_{12}$, or lithium metal.

5. A lithium ion battery, comprising:
a positive electrode;
a negative electrode; and
an electrolyte disposed between the positive electrode and the negative electrode,
wherein the negative electrode comprises:
a current collector; and
a β-phase-based polyvinylidene fluoride layer coating on the current collector,
wherein the β-phase-based polyvinylidene fluoride layer has a thickness of 1 μm to 10 μm,
wherein the β-phase-based polyvinylidene fluoride layer has an FTIR spectrum, in which signal intensity at 840 $cm^{-1}$ serves as signal intensity of β-phase polyvinylidene fluoride, signal intensity at 764 $cm^{-1}$ serves as signal intensity of α-phase polyvinylidene fluoride, and the signal intensity of β-phase polyvinylidene fluoride and the signal intensity of α-phase polyvinylidene fluoride have a ratio of 70:30 to 95:5 and
wherein the β-phase-based polyvinylidene fluoride layer consists of polyvinylidene fluoride.

6. The lithium ion battery as claimed in claim 5, wherein the current collector comprises lithium, copper, aluminum, nickel, stainless steel, or graphite.

7. The lithium ion battery as claimed in claim 5, further comprising an active material disposed between the current collector and the β-phase-based polyvinylidene fluoride layer, and the composition of the active material is different from the composition of the current collector.

8. The lithium ion battery as claimed in claim 7, wherein the active material comprises graphite, silicon, $Li_4Ti_5O_{12}$, or lithium metal.

* * * * *